US011483293B1

(12) United States Patent
Spain et al.

(10) Patent No.: US 11,483,293 B1
(45) Date of Patent: Oct. 25, 2022

(54) METHODS AND SYSTEMS FOR PROVIDING VIRTUAL DESKTOP INFRASTRUCTURE VIA SECURE CLASSIFIED REMOTE ACCESS AS A SERVICE

(71) Applicant: CDW LLC, Vernon Hills, IL (US)

(72) Inventors: Marty Spain, Indian Head, MD (US); Peter Joseph Dunn, Crestview, FL (US)

(73) Assignee: CDW LLC, Vernon Hills, IL (US)

( * ) Notice: Subject to any disclaimer, the term of this patent is extended or adjusted under 35 U.S.C. 154(b) by 0 days.

(21) Appl. No.: 17/340,687

(22) Filed: Jun. 7, 2021

(51) Int. Cl.
*H04L 9/40* (2022.01)
*G06F 9/455* (2018.01)

(52) U.S. Cl.
CPC ........ H04L 63/029 (2013.01); G06F 9/45558 (2013.01); *G06F 2009/45587* (2013.01)

(58) Field of Classification Search
CPC ............... H94L 63/029; G06F 9/45558; H04L 63/0428; H04L 63/0272
See application file for complete search history.

(56) References Cited

U.S. PATENT DOCUMENTS

| | | | | |
|---|---|---|---|---|
| 8,291,488 | B2* | 10/2012 | Faraboschi | H04L 63/0272 726/15 |
| 9,191,377 | B2* | 11/2015 | Charan | H04L 63/0471 |
| 10,382,401 | B1* | 8/2019 | Lee | H04L 63/166 |
| 10,742,649 | B1* | 8/2020 | Hook, Jr. | H04L 63/0876 |
| 10,904,350 | B1 | 1/2021 | Kudrin et al. | |
| 10,979,402 | B1* | 4/2021 | Hartley | H04L 45/74 |
| 2008/0133964 | A1* | 6/2008 | Rogers | G06F 11/2294 714/4.1 |
| 2009/0187763 | A1* | 7/2009 | Freericks | H04L 67/34 713/167 |
| 2014/0082719 | A1* | 3/2014 | Persson | H04L 41/0803 726/15 |
| 2015/0358392 | A1* | 12/2015 | Ramalingam | H04L 41/0273 709/203 |
| 2017/0048278 | A1 | 2/2017 | Tomasso | |

(Continued)

OTHER PUBLICATIONS

NSA Central Security Service, "Commercial Solutions for Classified Program (CSfC)". Retrieved from the Internet at: <https://www.nsa.gov/resources/everyone/csfc/> (2021).

(Continued)

*Primary Examiner* — Shanto Abedin
(74) *Attorney, Agent, or Firm* — Marshall, Gerstein & Borun LLP; Randall G. Rueth

(57) ABSTRACT

A virtual desktop infrastructure system includes a switch matrix and an end user device including a memory with instructions that when executed cause the system to initialize and configure the end-user device, establish a tunnel via the switch matrix, perform dependency verification, enforce a policy rule, and cause the end-user device to access the virtual desktop infrastructure via the tunnel. A method includes initializing and configuring the end-user device, establishing a tunnel via the switch matrix, performing dependency verification, enforcing a policy rule, and causing the end-user device to access the virtual desktop infrastructure via the tunnel. A non-transitory computer readable medium includes program instructions that when executed, cause a computer to initialize and configure the end-user device, establish a tunnel via the switch matrix, perform dependency verification, enforce a policy rule, and cause the end-user device to access the virtual desktop infrastructure via the tunnel.

20 Claims, 16 Drawing Sheets

(56) References Cited

U.S. PATENT DOCUMENTS

| | | | | |
|---|---|---|---|---|
| 2017/0324566 | A1 | 11/2017 | Kawasaki et al. | |
| 2018/0198760 | A1* | 7/2018 | Murray | H04L 63/0272 |
| 2018/0262346 | A1* | 9/2018 | Levy | H04L 9/006 |
| 2020/0089573 | A1* | 3/2020 | Baggerman | G06F 9/45558 |
| 2020/0186532 | A1 | 6/2020 | Dynkin et al. | |
| 2020/0403864 | A1* | 12/2020 | Saenger | G06F 9/44505 |

OTHER PUBLICATIONS

NSA Central Security Service, "Commercial Solutions for Classified (CSfC)". Retrieved from the Internet at: https://apps.nsa.gov/iaarchive/programs/iad-initiatives/commercial-solutions-for-classified.cfm <https://protect-us.mimecast.com/s/EZBgCAD8y3i9jREGI8ffRE> (2015).

C4isrnet, "The Army will soon allow users to access classified info from home". Retrieved from the Internet at: https://www.c4isrnet.com/2020/06/22/the-army-will-soon-allow-users-to-access-classified-info-from-home/ <https://protect-us.mimecast.com/s/5bCHCBB1z3fVvn8zSN9sdq> (2020).

Forcepoint, "A secure access solution with support for one or many globally dispersed sites". Retrieved from the Internet at: <https://www.forcepoint.com/product/cross-domain-security/forcepoint-trusted-thin-client> (2021).

"Oracle VM VirtualBox®", User Manual, Version 4.1.10, 298 pp,, retrieved from the Internet at: <https://www.virtualbox.org/wiki/Documentation (Jan. 2012).

International Application No. PCT/US2022/027274, International Search Report and Written Opinion, dated Aug. 4, 2022.

* cited by examiner

METHODS AND SYSTEMS FOR PROVIDING VIRTUAL DESKTOP INFRASTRUCTURE VIA SECURE CLASSIFIED REMOTE ACCESS AS A SERVICE

TECHNICAL FIELD

The present disclosure is generally directed to methods and systems for providing virtual desktop infrastructure via secure classified remote access as a service, and more particularly, to techniques for enabling secure access to multiple networks from one or more end user devices.

BACKGROUND

Users increasingly require access to sensitive information via computer networks. However, such access may include the use of public networks, such as the Internet. Whether this sensitive information includes state secrets (e.g., classified information), or the valuable trade secrets of corporations, users may need to access information at varying classification levels (e.g., from non-classified up to top secret) across multiple networks that have different respective classification levels.

Existing techniques for providing access to remote networks from user devices are expensive and require dedicated remote access hardware. For example, the mobile user (e.g., military personnel) may be required to carry multiple laptop computers, each one is used to access a respective remote computing network (e.g., seven laptops to access seven separate networks). Such hardware requirements are physically burdensome to the end user, thus reducing effectiveness, not to mention expensive and wasteful of computing resources.

Furthermore, existing remote access techniques are not adaptable to secure/classified networking requirements. For example, conventional techniques require that remote access hardware be physically shipped to a central point (e.g., an information technology service center) for software and/or configuration updates (e.g., to update certificates that allow the remote access hardware to connect to private networks). The requirement, present in conventional remote access techniques, to physically ship remote access hardware for updating results in wasted resources, long delays of time (e.g., weeks or more), and a reduction in the security the remote access hardware due to the inherent loss of physical control due to shipping.

Existing solutions for accessing multiple networks, in addition to requiring users to carry multiple laptops, requires extensive time, for several reasons. First, installation of conventional classified networks requires renovation of building sites to include specialized hardware (e.g., aluminum tubes). Many buildings do not allow this, or charge exorbitant renovation fees. Such installations may take a year or more to lay the groundwork for classified communications. A conventional classified location, once set up, may need to be torn down quickly for operational reasons, and the costs of the initial setup cannot be recovered.

Moreover, conventional remote access techniques have not kept pace with the remote access demands brought about by increase remote users during the COVID-19 pandemic. Such problems have only been amplified by remote access hardware deployed overseas. In government use, remote access systems are generally subject to stringent agency policies (e.g., those of the National Security Agency (NSA)) that complicate efforts to automate remote access capabilities. Such policies may include, for example, a prohibition against user selection of alternate network routes, location determination functions, etc. Thus, for example, conventional remote access techniques generally lack multi-site capabilities, failover capabilities, etc.

Conventional techniques do not currently successfully integrate commercial solutions for classified information, with multiple levels of security and virtual desktop infrastructure to provide secure classified remote access as a service. The cyber security demands for secret and/or classified networks present significant challenges, and require significant changes to an existing information system. Customers of such networks may require reassessment of system security, including existing plan of actions and milestones, risk assessment, NIST control compliance, and information system baseline. Additionally, many organizations are required to comply with a difficult and costly change management process. Operations and management functions are typically considered essential, but are difficult to execute due to geographic location and/or security clearance requirements, resulting in limited availability of qualified technical resources.

BRIEF SUMMARY

In one aspect, computing system for providing a virtual desktop infrastructure via secure classified remote access as a service includes: a black network; a gray network; a red network; and an end-user device. The end-user device includes one or more processors, one or more network interface controllers; and a memory including instructions. The instructions, when executed by the one or more processors cause the system to: (i) initialize, via the one or more processors, the end-user device; (ii) configure, via the one or more processors, the end-user device; (iii) establish, via the one or more network interface controllers, a network tunnel from the end-user device to the red network via the black network and the gray network; (iv) perform, via the one or more processors, dependency verification with respect to the configuration of the end-user device; (v) enforce, via the one or more processors, one or more policy rules with respect to the configuration of the end-user device; and (vi) use the end-user device to access the virtual desktop infrastructure via the network tunnel.

In another aspect a computer-implemented method for providing a virtual desktop infrastructure to an end-user device via secure classified remote access as a service includes: (i) initializing, via one or more processors, the end-user device; (ii) configuring, via one or more processors, the end-user device; (iii) establishing, via one or more processors, one or more network tunnels between the end-user device and one or more remote computer networks; (iv) performing, via one or more processors, dependency verification with respect to the configuration of the end-user device; (v) enforcing, via one or more processors, one or more policy rules with respect to the configuration of the end-user device; and (vi) causing the end-user device to access the virtual desktop infrastructure via the one or more network tunnels.

In yet another aspect, a non-transitory computer readable medium includes program instructions that when executed, cause a computer to: (i) initialize, via one or more processors, an end-user device; (ii) configure, via one or more processors, the end-user device; (iii) establish, via one or more network interface controllers, a network tunnel from the end-user device to a red network via a black network and a gray network; (iv) perform, via one or more processors, dependency verification with respect to the configuration of the end-user device; (v) enforce, the one or more processors, one or more policy rules with respect to the configuration of the end-user device; and (vi) cause the end-user device to access a virtual desktop infrastructure via the network tunnel.

BRIEF DESCRIPTION OF THE FIGURES

The figures described below depict various aspects of the system and methods disclosed therein. It should be understood that each figure depicts one embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals. The abbreviations used in the figures are sometimes identified in the Abbreviations Table at the end of this patent specification. Otherwise, abbreviations are identified in the description of the invention.

Figure 1:
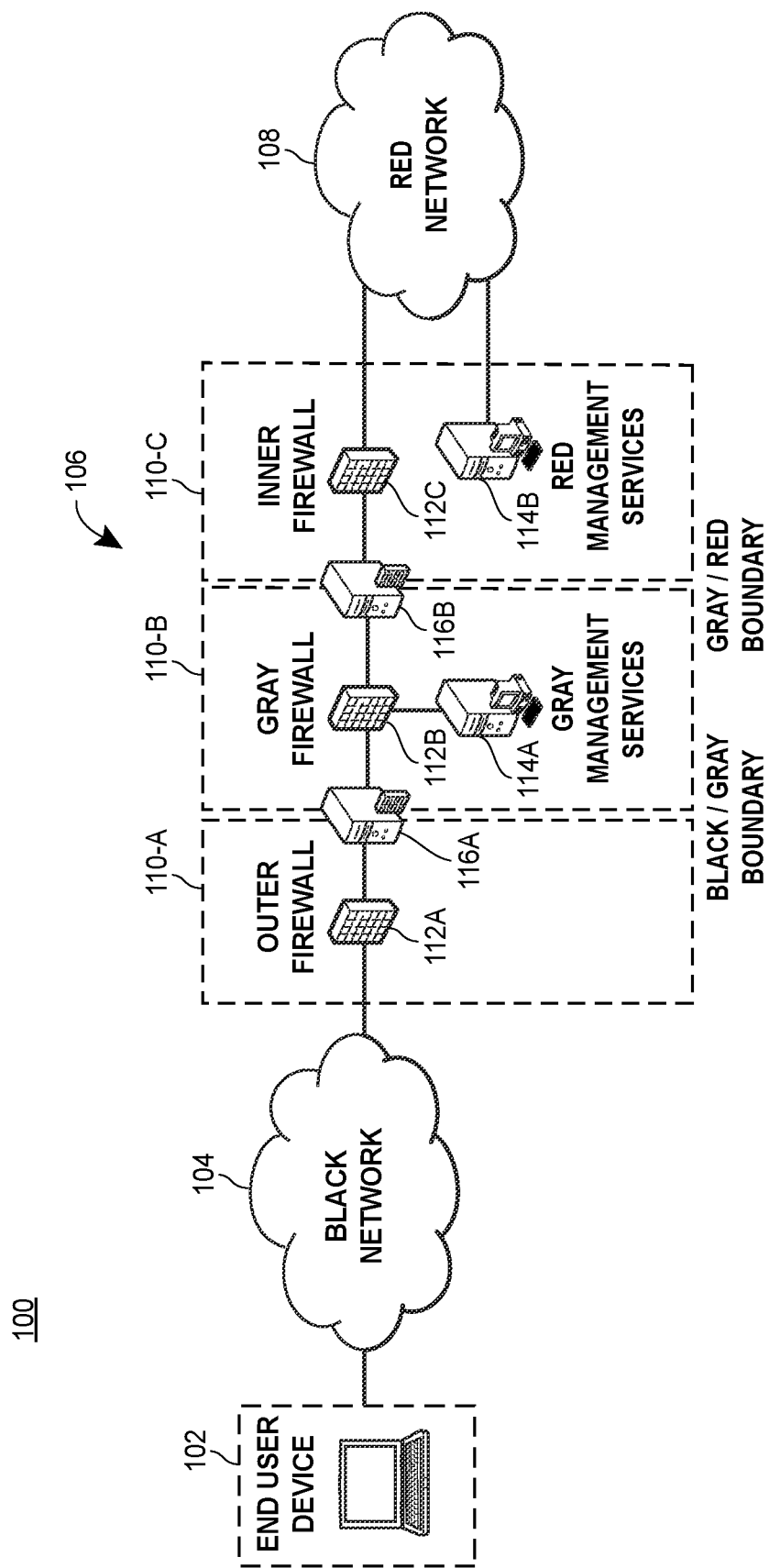
FIG. 1 depicts an exemplary high level secure classified remote access as a service mobile access capability package computing environment, according to one embodiment and scenario.

The figures depict preferred embodiments for purposes of illustration only. One skilled in the art will readily recognize from the following discussion that alternative embodiments of the systems and methods illustrated herein may be employed without departing from the principles of the invention described herein. Some abbreviations in the drawings and the patent specification are identified in the Abbreviations Table at the end of the specification.

DETAILED DESCRIPTION

Overview and Advantages

The present techniques provide methods and systems for, inter alia, providing virtual desktop infrastructure (VDI) via secure classified remote access as a service (SCRAaaS). In general, the present techniques may be used by military and/or civilian actors, to enable connectivity of one or more remote devices to one or more secured networks. In some embodiments, the one or more secured networks may be arrayed in a multi-classification setting.

The present techniques may be implemented by a company acting in its capacity as a government contractor. For example, the company may have working relationships with partners (e.g., one or more suppliers) in the technology industry, wherein such partners have full-time representation at the company's sales offices to facilitate requests for information and to assist with designing solutions. The company may offer discrete hardware and software products and integrated technology solutions, and may modify instances of hardware and software products provided to accommodate client needs, and to ensure compliance. For example, the company may modify offerings to comply with the Commercial Solutions for Classified Program (CSfC) Components List of the NSA or other policies (e.g., a Forcepoint hardware compatibility list), and to comply with updates to such policies. The company may provide reliable, streamlined access to hardware, software, warranty products and services required for the present techniques to include end user devices and mobile Wi-Fi (MiFi) equipment, as discussed below.

The present techniques enable remote users to access and/or exchange sensitive information (e.g., research and development materials, classified information, etc.) across multiple networks of varying security levels from a single portable end user device. For example, in some embodiments, the present techniques allow U.S. Department of Defense (DoD) members to connect to multiple independent levels of security (MILS) networks. For example, the present techniques may enable access to classified networks of varying classification levels from insecure locations (e.g., from home, from an overseas location, etc.). The present techniques may enable remote access to Secret Internet Protocol Router Network (SIPRNet) and/or Non-classified Internet Protocol Router Network (NIPRNet), while following all security requirements outlined by NSA guidance. The present techniques may include techniques for providing Device as a Service (DaaS) support to customers for large numbers of users/devices (e.g., 600,000 devices or more) in support of the customers' missions.

The present techniques enables the remote user (e.g., a teleworker) to access classified networks, using a combination of Commercial Off-The-Shelf (COTS) and Government-Off-The-Shelf (GOTS) components. In general, the present techniques facilitate access via one or more virtual machines installed in an end user device, which include scripts for establishing inner tunnels and outer tunnels. Specifically, the present techniques enable users to access VDI services via multiple virtual private networks (VPNs) and other components to validate the user and secure connections, and include instructions for automating aspects of solution maintenance, including certificate renewal, tunnel creation/destruction, VPN configuration and maintenance, route optimization, network/node selection, etc.

The present techniques provide several advantages. First, the present techniques include a framework that enables quick remediation and solution of challenges amplified by the SARS-CoV-2 pandemic. Second, the present techniques are cost effective, scalable, and unlike conventional techniques, may be delivered as a cloud-based service in some embodiments. Third, the present techniques solve long-term issues of utilizing classified systems in locations not considered for open storage of classified materials or data. Fourth, the present techniques advantageously improve the remote access computing methods and systems by reducing the need for bulk encryption devices, reducing the need for client connectivity devices, and reducing the need for controls of network connections. The present techniques enable a single laptop to support multiple separate networks. Fifth, in contrast to conventional systems, the solution can be installed (e.g., by contractors) in a matter of days, or less. This speed is a result of the present techniques automating the build process, construction and deployment and configuration of secured networks. Sixth, the present techniques support multiple optionally different classification level networks, whereas conventional solutions only work with one. The solution is a hardware and software solution that may be deployed/installed by the company. Additional advantages of the present techniques that will be discussed below.

Exemplary Network Design, Environment & Architecture Embodiments

FIG. 1 depicts an exemplary high level secure classified remote access as a service mobile access capability package computing environment 100, according to one embodiment and scenario. In some embodiments, dashed lines of FIG. 1 may be representative of the boundaries of the company's SCRAaaS offering. Overall, the Mobile Access Capability Package (MACP) computing environment 100 includes an end-user device (EUD) 102, a black network 104, a firewall layer 106 and a red network 108.

The EUD 102 may be a suitable device for accessing the environment 100. The EUD 102 may be an individual computing device, a group (e.g., cluster) of multiple computing devices, or another suitable type of computing device or system (e.g., a collection of computing resources). For example, the EUD 102 may be any suitable computing device (e.g., a server, a mobile computing device, a smart phone, a tablet, a phablet, a laptop, a wearable device, etc.). In some embodiments, one or more components of the EUD 102 may be embodied by one or more virtual instances (e.g., a cloud-based virtualization service, a trusted thin client (TTC), etc.). In such cases, one or more EUD 102 may be included in a remote data center (e.g., a cloud computing environment, a public cloud, a private cloud, etc.).

In embodiments where the EUD 102 is a TTC, some of the benefits include that the EUD 102 may comprise one or more COTS devices that are read only and include a single secure connection for simultaneous access to multiple networks/clouds with no data stored locally. In that case, the EUD 102 may enable a significant return-on-investment through lower ownership costs (e.g., hardware, infrastructure, office space, power consumption, administration, etc.). Additional benefits include less desktop hardware space, allowing for space reclamation, and reduced cabling and reduced need for cooling infrastructure. Such EUDs 102 maximize security, usability and adaptability and come in many flavors, including commodity hardware from vendors such as HP® and Dell®. Such devices may be implemented using true thin client machines, thick client machines (e.g., repurposed PCs), virtual machines (e.g., Type 1 and Type 2 hypervisors), and as mobile devices (e.g., laptops and hybrid devices). Such EUDs 102 are significantly flexible to support environments with as few as 1 network or many more (e.g., 80 networks or more). TTCs may include a streamlined, GUI-based administration through robust centralized management and monitoring, and support a wide array of hardware. Implementing the EUD 102 as a TTC may strengthen DoD and IC desktop consolidation initiatives with a wide variety of backend virtualization platforms (e.g., Citrix, Microsoft and VMware).

In some embodiments, the EUD 102 may support common access card (CAC), SAC, and SIPR token smartcards for identity management and access authorization to back-end Microsoft windows servers, and Commercial National Security Algorithm Suite (CNSA) cryptographic algorithms for encrypted communications on the client network. In general TTCs offer streamlined, scalable architecture supporting globally disparate sites with distribution consoles that serve multiple clients and span geographically.

The EUD 102 may provide a VDI. Specifically, the EUD 102 may include instructions for displaying a VDI (e.g., a VMware Horizon VDI). The EUD 102 may include universal serial bus (USB) pass-through of webcams, via a remote distribution console. This advantage alone enables teleconferences including audio and video, in some embodiments).

The EUD 102 may include a processor and a network interface controller (NIC). The NIC may include any suitable network interface controller(s), such as wired/wireless controllers (e.g., Ethernet controllers), and facilitate bidirectional/multiplexed networking via one or more networks, firewalls/firewall regions, and/or switches (e.g., the black network 104, the outer firewall region 110-A, the red network 108, the VPN 116-B, etc.). The processor may include any suitable number of processors and/or processor types, such as CPUs and one or more graphics processing units (GPUs). Generally, the processor may be configured to execute software instructions stored in a memory. The memory may include one or more persistent memories (e.g., a hard drive/solid state memory) and store one or more set of computer executable instructions/modules.

The EUD 102 may further include an input device and an output device. The input device may include any suitable device or devices for receiving input, such as one or more microphone, one or more camera, a hardware keyboard, a hardware mouse, a capacitive touch screen, etc. The output device may include any suitable device for conveying output, such as a hardware speaker, a computer monitor, a touch screen, etc. In some cases, the input device and the output device may be integrated into a single device, such as a touch screen device that accepts user input and displays output. The EUD 102 may be associated with (e.g., owned/operated by) the company that services corporate and/or government customers.

In some embodiments, one or more component(s) of the MACP environment 100 (e.g., the EUD 102) may meet CSfC, MILS and/or VDI requirements at the SIPRNet level. To meet these requirements, the present techniques may incorporate a blend of technologies including COTS and/or GOTS technologies. Specifically, in some embodiments, the design of the system 100 comprises a plurality of COTS products selected from the CSfC components list (when applicable) and meet the requirements outlined in the SCRAaaS Performance Work Statement (PWS), as discussed further with respect to FIG. 2A, FIG. 2B and FIG. 2C.

The present techniques may include strategic selection of a set of components to meet stringent NSA requirements for CSfC and Cross Domain Access (CDA) approvals. This set of components may include CSfC MACP-compliant configurations installed on one or more end-user devices 102 (e.g., a Forcepoint TTC). In some embodiments, the one or more end-user devices 102 may connect to a distribution server (e.g., a Forcepoint Distribution Console) located in a data center via a CSfC transport subsystem, as depicted in FIG. 2C, for example. The distributions server may provide a CDA solution to enable connections to network resources (e.g., a SIPRNet VDI such as a VMWare Horizon VDI, to NIPRNet, to a civilian corporate airgapped research and development network, and/or to other computing environments).

Some additional ideas may include AI/machine learning (e.g., predictive analysis based on behavior) to dynamically change a training environment. I.e., classroom as a service, used for cyberwarfare training. Designed to emulate the real world and allow students to practice against adversaries. Modify environment based on student behavior, identify cheating and flag to instructor, etc. Automate to avoid manual effort and enhance realism.

The black network 104 may be a single communication network, or may include multiple communication networks of one or more types (e.g., one or more wired and/or wireless local area networks (LANs), and/or one or more wired and/or wireless wide area networks (WANs) such as the Internet). The black network 104 may enable bidirectional communication between the EUD 102 and the firewall layer 106. In some embodiments, the black network 104 may include internet routing nodes, semi-private (e.g., Level III) nodes, and/or public nodes.

The firewall layer 106 may include an outer firewall region 110-A including an outer firewall 112-A, a gray firewall region 110-B including a gray firewall 112-B, and an inner firewall region 110-C including an inner firewall 112-C. The firewalls 112 may include one or more respective management services nodes. For example, the MACP environment 100 depicts the gray firewall region 110-B as including a gray management services node 114-A behind the gray firewall 112-A, and the inner firewall region 110-C including a red management services node 114-B.

Each of the firewalls 112 may be implemented, respectively, as either hardware or software firewalls. For example, in some embodiments a firewall (e.g., the inner firewall 112-C is implemented using a Cisco switch and/or router). In some embodiments, the outer firewall 112-A is implemented using a Linux machine. In still further embodiments, the gray firewall 112-B is implemented using kernel-level software (e.g., iptables) and/or user space software (e.g., Shoreline firewall software). The firewalls 112 may, in some embodiments, include additional software components for performing various network-related functions (e.g., packet logging software, intrusion detection software, etc.).

The management services nodes 114 may be directly or indirectly communicatively coupled to components in adjacent regions 110. The regions 110 may be separated by additional components. For example, the MACP environment 100 depicts that the outer firewall region 110-A and the gray firewall region 110-B are communicatively coupled by an outer VPN 114-A. The MACP environment 100 depicts that the gray firewall region 110-B and the inner firewall region 110-C are communicatively coupled by an inner VPN 116-B.

The red network 108 may be a single communication network, or may include multiple communication networks of one or more types (e.g., one or more wired and/or wireless local LANs, and/or one or more wired and/or wireless WANs such as the Internet). The red network 108 may enable bidirectional communication between elements of the red network 108 (e.g., the red management services node 114-B and the firewall layer 106 (e.g., the inner firewall 110-C). In some embodiments, the red network 108 may include one or more private subnets each including of one or more respective classification level.

In some embodiments, some of the components comprising the MACP environment 100 may be located within a military base installation, in some embodiments (e.g., in Fort Bragg, N.C.). The MACP environment 100 may be compatible with various connectivity options required by SCRAaaS solutions, including connecting from outside of a military installation, a corporate network, etc. In some embodiments, the present techniques may provide the capability to communicate from within the installation and/or within United States Department of Defense Information Networks (DoDIN). In still further embodiments, the MACP environment may include a computer network architecture that splits external connectivity configuration between networks (e.g., between the Continental United States (CONUS)-wide MILS-CT VRF network within DoDIN and the Joint Regional Security Stacks' (JRSS) "army-conus-ct-dmz" network external to DoDIN).

Advantageously, the split architecture enables the MACP environment 100 to accept connections from network endpoints (e.g., one or more of the end user devices 102), and thus, to be utilized remotely, away from the authorized government facility, while also being seamlessly capable of being brought inside the government facility, connected to a docking station, and viewing the same resources. This capability also advantageously enables the option to install desktop thin-clients within the government facilities that can occupy spaces that are not cleared for secret open storage, as such end user devices 102 are unclassified when powered off. Further capabilities advantageously enabled by the split architecture of the MACP environment 100 is allowing users (e.g., a system administrator) to manage certificates remotely, including certificate renewals and certificate revocations. This capability enables the long-term support and management of the TTC end user devices (EUDs). The present techniques include a certificate management process that uses features inherent in the components selected for the MACP environment 100 to provide a seamless user experience for certificate management.

The present techniques include a CSfC registration framework to enable the registration of the CSfC solution to be completed in a timely and organized manner. The present techniques may automate aspects of CSfC registration form submission, and may be integrated with Army Command, Control, Communications, Computers, Cyber, Intelligence, Surveillance and Reconnaissance CENTER (C5ISR). Additional aspects may be automated in some embodiments, such as compliance checklists, and generation of NSA-CSfC Program Management Office (PMO)-compliant network diagrams.

Exemplary Black Network Embodiments

Figure 2A:
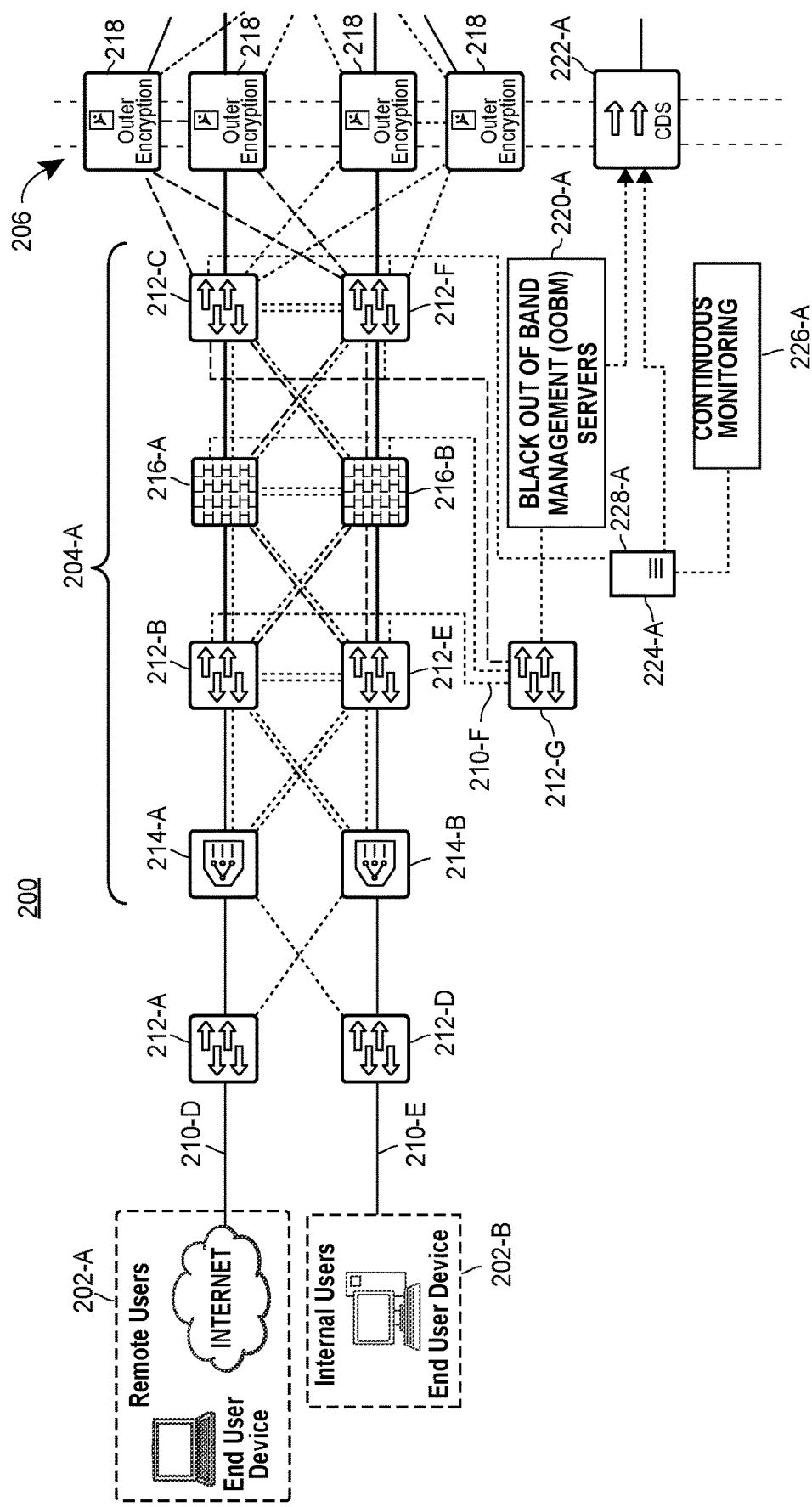
FIG. 2A depicts a portion of an exemplary detailed architectural diagram of a computing system corresponding to the secure classified remote access as a service mobile access capability package computing environment of FIG. 1, according to one embodiment and scenario.

FIG. 2A depicts a portion of an exemplary detailed architectural diagram of a computing system 200 corresponding to the secure classified remote access as a service mobile access capability package computing environment 100 of FIG. 1, according to one embodiment and scenario. Specifically, FIG. 2A depicts a detail view of the EUD 102, the black network 104 and the outer firewall region 110-A of the environment 100.

The computing system 200 includes an internet end user device 202-A and an internal end user device 202-B, a black network layer 204-A and a gray network boundary 206. The internet end user 202-A and/or the internal end user device 202-B may correspond to the EUD 102, in some embodiments. Of course, the system 200 of FIG. 2 may support any number of end user devices 202. The black network layer 204-A may correspond to the black network 104 of FIG. 1, in some embodiments. The gray network boundary 206 may correspond to the boundary between the outer firewall region 110-A and the gray firewall region 110-B depicted in FIG. 1, in some embodiments. The system 200 includes a wired communication link 210-D and a wired communication link 210-E.

The link 210-D may be an external transport link (e.g., a JRSS external transport link) communicatively coupling an external switch 212-A (e.g., a JRSS external customer provided access switch), an external load balancer 214-A (e.g., an F5 load balancer BIG-IP i5820 FIPS stack load balancer), a first untrusted black switch 212-B (e.g., a Cisco Nexus Switch 93180YC-EX), a first black firewall 216-A (e.g., a Palo Alto Firewall PA-5220) and a second untrusted black switch 212-C (e.g., another 93180YC-EX) to the gray network boundary 206.

Figure 2B:
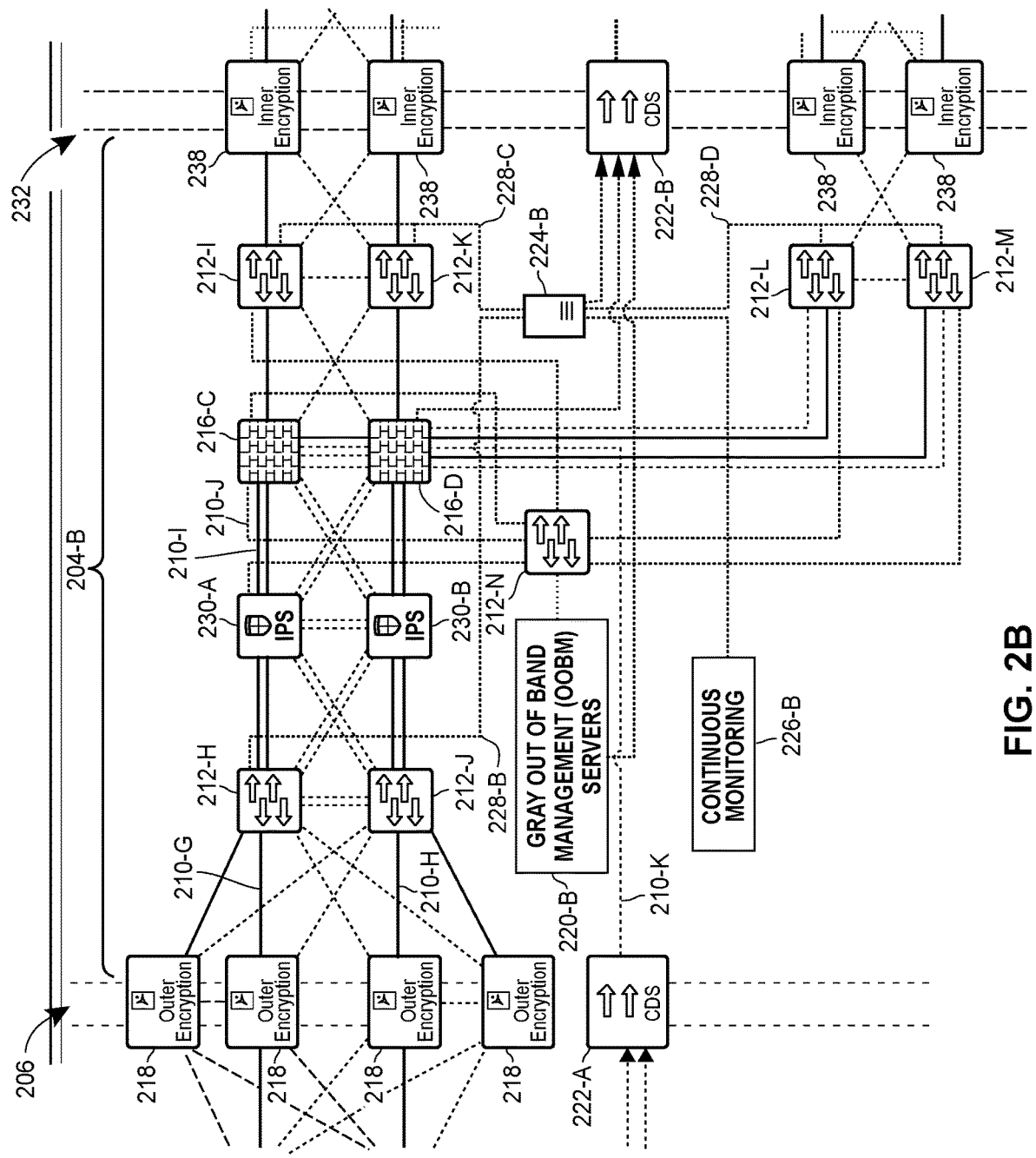
FIG. 2B depicts a portion of an exemplary detailed architectural diagram of a computing system corresponding to the secure classified remote access as a service mobile access capability package computing environment of FIG. 1, according to one embodiment and scenario.
Figure 2C:
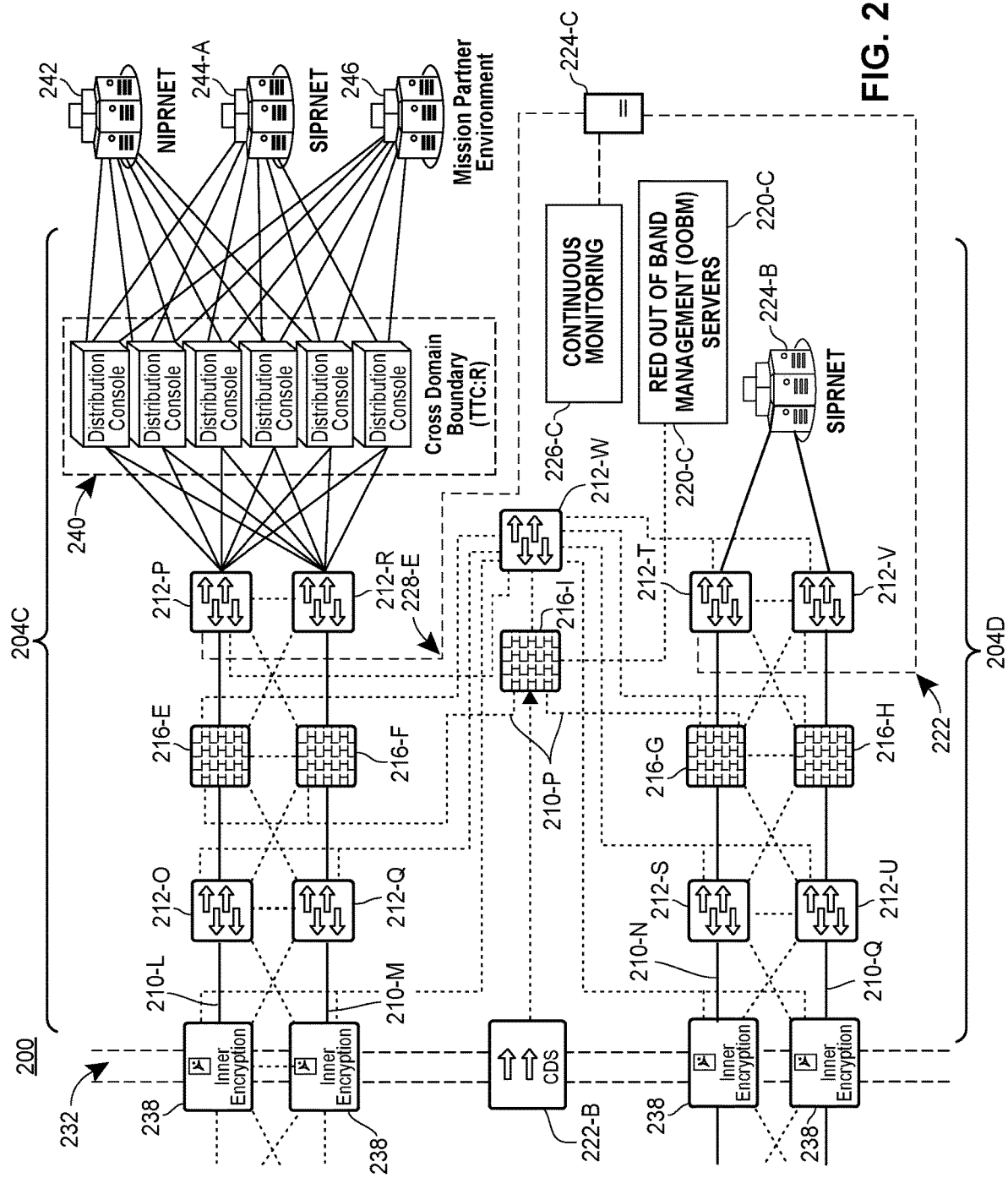
FIG. 2C depicts a portion of an exemplary detailed architectural diagram of a computing system corresponding to the secure classified remote access as a service mobile access capability package computing environment of FIG. 1, according to one embodiment and scenario.

The link 210-E may provide access to resources in a gray network 204-B, as shown further in FIG. 2B. In some embodiments, the second untrusted black switch 212-C may be coupled to one or more outer encryption controllers 218. For example, the one or more outer encryption controllers 218 may be implemented using Aruba VPN controllers (e.g., one or more Aruba Mobility Controller 7220) and may implement Data at Rest (DAR) encryption and/or TTC encryption.

The link 210-E may be an internal transport link (e.g., a JRSS internal transport link) communicatively coupling an internal switch 212-D (e.g., a JRSS internal customer provided access switch), an internal load balancer 214-B (e.g., an F5 load balancer BIG-IP i5820 FIPS stack load balancer), a third untrusted black switch 212-E (e.g., yet another 93180YC-EX), a second black firewall 216-B (e.g., another Palo Alto Firewall PA-5220) and a fourth untrusted black switch 212-F (e.g., still another 93180YC-EX) to the gray network boundary 206.

The link 210-E may provide access to resources in a gray network 204-B, as shown further in FIG. 2B. In some embodiments, the fourth untrusted black switch 212-F may be coupled to the one or more outer encryption controllers 218.

In FIGS. 2A, 2B and 2C, solid connecting lines of the system 200 may generally depict default communication links, whereas dotted lines depict wired high availability and/or failover path communication links. For example, one or more of the switches 212, load balancers 214 and/or firewalls 216 may be communicatively coupled to a black out-of-band management (OOBM) switch 212-G (e.g., a Cisco 9348GC) and/or to one or more black OOBM servers 220-A via an OOBM link 210-F. The OOBM servers 220-A may be communicatively coupled to the gray network boundary 206 via a high-speed guard black-to-gray Cross Domain Solutions (CDS) controller 222-A. The second untrusted black switch 212-C and/or the fourth untrusted black switch 212-F may be communicatively coupled to a black intrusion prevention system (IPS) sensor 224-A and/or one or more black continuous monitoring servers 226-A via a first NSA MACP monitor point 228-A. The IPS sensor 224-A may be communicatively coupled to the CDS 222-A, in some embodiments.

Exemplary Gray Network Embodiments

Turning to FIG. 2B, a portion of an exemplary detailed architectural diagram of a computing system 200 corresponding to the secure classified remote access as a service mobile access capability package computing environment 100 of FIG. 1 is depicted, according to one embodiment and scenario. Specifically, the computing system 200 includes a gray network layer 204-B and a red network boundary 232. The gray network layer 204-B may correspond to a detail view of the gray firewall region 110-B of the environment 100, including the black/gray boundary of the firewall layer 106 of FIG. 1 (and the gray network boundary 206 of FIG. 2A). The red network boundary 232 may correspond to the gray/red boundary of the firewall layer 106 of FIG. 1. The system 200 includes an online wired communication link 210-G and an offline wired communication link 210-H.

The link 210-G may be a transport link (e.g., an online red transport link) communicatively coupling the black network layer 204-A via the gray network boundary 206 to elements of the gray network 204-B. For example, the link 210-G may communicatively couple the outer encryption controllers 218 to a first gray untrusted switch 212-H (e.g., a Cisco Nexus Switch 93180YC-EX), a first gray IPS 230-A (e.g., a Cisco IPS (NGFW) FirePower 4115), a first gray firewall 216-C (e.g., a Palo Alto Firewall PA-5220), and a first gray trusted switch 212-I (e.g., another Cisco Nexus Switch 93180YC-EX).

The link 210-H may be a transport link (e.g., an offline red transport link) communicatively coupling the black network layer 204-A via the gray network boundary 206 to elements of the gray network 204-B. For example, the link 210-F may communicatively couple the outer encryption controllers 218 to a second gray untrusted switch 212-J (e.g., a Cisco Nexus Switch 93180YC-EX), a second gray IPS 230-B (e.g., a Cisco IPS (NGFW) FirePower 4115), a second gray firewall 216-D (e.g., a Palo Alto Firewall PA-5220), and a second gray trusted switch 212-K (e.g., another Cisco Nexus Switch 93180YC-EX).

One or more of the components of the gray network 204-B may be communicatively coupled by additional links. For example, in some embodiments, one or more of the first gray untrusted switch 212-H, the first gray IPS 230-A and the first gray firewall 216-C may be communicatively coupled by an offline link. In some embodiments, one or more of the second gray untrusted switch 212-J, the second gray IPS 230-B, the second gray firewall 216-D, and the second gray trusted switch 212-K may be communicatively coupled by an online link. Further, the first gray firewall 216-C and/or the second gray firewall 216-D may be communicatively coupled to one or more of a first gray untrusted DAR switch 212-L (e.g., a Cisco Nexus Switch 93180YC- EX) and/or a second gray untrusted DAR switch 212-M (e.g., a Cisco Nexus Switch 93180YC-EX).

Furthermore, in some embodiments, one or more of the first gray IPS 230-A, the second gray IPS 230-B, the first gray firewall 216-C, the second gray firewall 216-D, the a first gray trusted switch 212-I, the a second gray trusted switch 212-K, the first gray untrusted DAR switch 212-L and/or the second gray untrusted DAR switch 212-M may be communicatively coupled to a gray out-of-band management (OOBM) switch 212-N (e.g., a Cisco 9348GC) and/or to one or more gray OOBM servers 220-B via an OOBM link 210-I. In some embodiments, the firewall 216-C and/or the firewall 216-D may be communicatively coupled to the switch 212-N via a demilitarized zone (DMZ) link 210-J.

Still further, the first gray untrusted switch 212-H and/or the second gray untrusted switch 212-J may be communicatively coupled to a gray IPS sensor 224-B via a second NSA MACP monitor point 228-B. The gray IPS sensor 224-B may be communicatively coupled to one or more gray continuous monitoring servers 226-B. The first gray trusted switch 212-I and the second gray trusted switch 212-K may be communicatively coupled to the gray IPS sensor 224-B via a third NSA MACP monitor point 228-C. The first gray untrusted DAR switch 212-L and/or the second gray untrusted DAR switch 212-M may be communicatively coupled to the gray IPS sensor 224-B via a fourth NSA MACP monitor point 228-D.

In some embodiments, the one or more gray OOBM servers 220-B may be communicatively coupled to the red network boundary 232 (and an online red network 204-C and offline red network 204-D that lie beyond it, as depicted in FIG. 2C), via a high-speed guard gray-to-red CDS controller 222-B. The second gray trusted firewall 216-D may be communicatively coupled to the CDS controller 222-B. The gray IPS sensor 224-B may be communicatively coupled to the CDS 222-B, as shown. The CDS 222-A may be communicatively coupled to the firewall 216-D via a link 210-K.

The link 210-G and the link 210-H may provide access to resources in a red network 204-C, as shown further in FIG. 2C. In some embodiments, one or more of the switch 212-I, the switch 212-K, the switch 212-L, and/or the switch 212-M may be communicatively coupled to one or more inner encryption controllers 238 (e.g., a Cisco Firepower 4115 ASA). For example, the switch 212-I and the switch 212-K may access Cisco IPS (ASA) FirePower 4115 Inner Encryption controllers that implement the TTC encryption protocol whereas the switch 212-L and the switch 212-M access Cisco IPS (ASA) FirePower 4115 Inner Encryption controllers that implement the DAR encryption protocol. For example, in some embodiments, data transiting the switch 212-L and the switch 212-M may be bound for (or originating from) the online red network 204-C, whereas data transiting the switch 212-L and the switch 212-M may be bound for (or originating from) the offline red network 204-D, necessitating different respective encryption protocols, as depicted in FIG. 2C. Of course, the number and/or configuration of encryption controllers/protocols, switches, etc. may differ, depending on the needs of particular embodiments.

Exemplary Red Network Embodiments

Turning to FIG. 2C, a portion of an exemplary detailed architectural diagram of a computing system 200 corresponding to the secure classified remote access as a service mobile access capability package computing environment 100 of FIG. 1 is depicted, according to one embodiment and scenario. Specifically, the computing system 200 includes a red network boundary 232, an online red network layer 204-C and an offline red network layer 204-D. The computing system 200 further depicts a NIPRNet endpoint 242, an online SIPRNet endpoint 244-A and a Mission Partner Environment endpoint 246.

The online red network layer 204-C and the offline red network layer 204-D may, together, correspond to a detail view of the red firewall region 110-C of the environment 100, including the red network 108 of FIG. 1 (and the red network boundary 232 of FIG. 2B). The online red network layer 204-C includes a first online red transport link 210-L and a second online red transport link 210-M, communicatively coupling one or more inner encryption controllers 238 to a first red untrusted switch 212-O (e.g., a Cisco Nexus Switch 93180YC-EX) and a second red untrusted switch 212-Q (e.g., a Cisco Nexus Switch 93180YC-EX).

The first red untrusted switch 212-O and the second red untrusted switch 212-Q may be communicatively coupled, respectively, to a first red firewall 216-E (e.g., a Cisco IPS (NGFW) FirePower 4115 (DAR)) and a second red firewall 216-F (e.g., a Cisco IPS (NGFW) FirePower 4115 (DAR)). The first red firewall 216-E and the second red firewall 216-F may be further communicatively coupled, respectively, to a first red trusted switch 212-P (e.g., a Cisco Nexus Switch 93180YC-EX) and a second red trusted switch 212-R (e.g., a Cisco Nexus Switch 93180YC-EX). The first red trusted switch 212-P and the second red trusted switch 212-R may each be communicatively coupled to one or more cross domain boundary distribution consoles 240. For example, in some embodiments, the distribution consoles 240 may be Forcepoint Trusted Thin Client: Remote devices. Forcepoint TTC devices may be especially suitable, because these devices may be Raise the Bar (RTB) compliant CDA solutions that have passed stringent Cross Domain NSA requirements. Such compliance is important, given the need to expand the system 200 to encompass NIPRNet and other MPEs.

In some embodiments, distribution consoles 240 may be deployed in an N+1 configuration, a user limit (e.g., 400 users) per each of the distribution console 240. This configuration advantageously enables the MILS subsystem to be fault-tolerant and safeguards against a single component or server failure causing a catastrophic system failure. This configuration also enables scaling, by allowing additional nodes to be added to the distribution consoles 240 cluster, to enable increased user capacity. In some embodiments, the end-user devices 202 may include authentication information that the distribution consoles 240 may use to authenticate the user against a remote authentication source (e.g., the SIPRNet 244 active directory server) to provide an initial desktop authentication service.

Further, the distribution consoles 240 may enables VDI federation capabilities with the a distribution console spanning feature. The spanning enables the distribution consoles 240 to connect to one another, to share different VDI subsystems that may not be accessible locally. For example, a distribution console spanning setup could be created to connect to the Defense Information Systems Agency (DISA) Multinational Information Sharing (MNIS) infrastructure. Advantageously, this setup would enable access to several different MPEs, and add flexibility to the system's future growth as required by changing requirements. Distribution console spanning provides improved flexibility to the system 200.

Yet another advantage of the present techniques is that using TTC devices as shown enables the rapid addition of new networks to the system 200. Specifically, in some embodiments, a significant advantage of using a TTC (e.g., the Forcepoint TTC product) is that there is no need to add additional inner red CSfC components when a new network is added. In such cases, most or all CDA/MILS functions may occur in the data center, eliminating the need for extensive modifications to the system 200 to add a new network. For example, the system 200 may be modified to include softphone software that enables users (including those on SIPRNet and NIPRNet) to connect to voice over IP (VoIP) services.

As shown in FIG. 2C, the online red network layer 204-C may communicatively couple one or more of the distribution consoles 240 to the NIPRNet endpoint 242, the online SIPRNet endpoint 244-A and/or the Mission Partner Environment endpoint 246. The NIPRNet endpoint 242 may be a green network and a VDI access point. The online SIPRNet endpoint 244-A may be a red network and a VDI access point. The Mission Partner Environment endpoint 246 may be a future MPE network and VDI access point.

The inner encryption controllers 238 may be communicatively coupled to a black OOBM switch 212-W (e.g., a Cisco 9348GC switch) via an OOBM management network link. The first red untrusted switch 212-O and the second red untrusted switch 212-Q may be communicatively coupled to the black OOBM switch 212-W via the OOBM management network link. The first red firewall 216-E and the second red firewall 216-F may be communicatively coupled to the black OOBM switch 212-W via the OOBM management network link. The first red firewall 216-E and the second red firewall 216-F may be communicatively coupled to a red OOBM firewall 216-I (e.g., a PaloAlto PA3260) via a demilitarized (DMZ) access link for network services (e.g., certificates, NTP, DNS, etc.) 210-P. The high-speed guard gray-to-red CDS controller 222-B may be communicatively coupled to the red OOBM firewall 216-I. The red OOBM firewall 216-I may be communicatively coupled to the black OOBM switch 212-W.

The offline red network layer 204-D may include second inner encryption controllers 238 (e.g., a Cisco IPS (ASA) FirePower 4112 DAR Inner Encryption controller). The inner encryption controllers 238 may be communicatively coupled to a third red untrusted switch 212-S and a fourth red untrusted switch 212-U via, respectively, an offline red transport link 210-N and an offline red transport link 210-O. The third red untrusted switch 212-S and the fourth red untrusted switch 212-U may be communicatively coupled, respectively, to a third red firewall 216-G and a fourth red firewall 216-H. The third red firewall 216-G and the fourth red firewall 216-H may be communicatively coupled, respectively, to a third red trusted switch 212-T (e.g., a Cisco Nexus Switch 9318YC-EX (DAR)) and a fourth red trusted switch 212-V (e.g., a Cisco Nexus Switch 9318YC-EX (DAR)).

The inner encryption controllers 238 may be communicatively coupled to the black OOBM switch 212-W. The third red untrusted switch 212-S and the fourth red untrusted switch 212-U may be communicatively coupled to the black OOBM switch 212-W. The third red firewall 216-G and the fourth red firewall 216-H may be communicatively coupled to the red OOBM firewall 216-I via the DMZ access link for network services 210-K. The third red firewall 216-G and the fourth red firewall 216-H may be communicatively coupled to the black OOBM switch 212-W. The third red trusted switch 212-T and the red trusted switch 212-V may be communicatively coupled to the black OOBM switch 212-W. The third red trusted switch 212-T and the fourth red trusted switch 212-V may be communicatively coupled to an offline SIPRNet endpoint 244-B.

The offline red network layer 204-D may include one or more red OOBM servers 220-C that are communicatively coupled to the red OOBM firewall 216-I and/or the third red trusted switch 212-T and the fourth red trusted switch 212-V. One or more of the first red trusted switch 212-P, the second red trusted switch 212-R, the third red trusted switch 212-T or the fourth red trusted switch 212-V may be communicatively coupled to a red IPS sensor 224-C via a NSA MACP monitor point 228-E or an NSA MACP monitor point 228-F. The red IPS sensor 224-C may be communicatively coupled to one or more red continuous monitoring servers 226-C.

The OOBM links 210, OOBM switches 212, OOBM firewalls 216, OOBM servers 220, etc. may be included in a dedicated OOBM subsystem of the computing system 200, to ensure proper observation of compliance criteria. For example, the dedicated OOBM subsystem may ensure compliance of approved Department of Defense (DoD) compliance criteria, Defense Information Systems Agency (DISA) Security Technical Implementation Guides (STIGs) standards, DoD Information Assurance Vulnerability Alert (IAVA) requirements, etc. for the entire CSfC solution and VDI components. The dedicated OOBM subsystem may include security maintenance, system or device patches, IAVAs, STIGs, updates, and backups for servers, databases, virtual desktop images, and operation and user profile data.

The dedicated OOBM subsystem of the computing system 200 may ensure all information system accreditation facets are configured, documented, and current. For example, the dedicated OOBM subsystem may incorporate the NSA's CDS, such as the CDS 222, to transfer data from black networks and/or gray networks to red networks (e.g., to SIPRNets network endpoints 244) to enable event data to be consolidated in one data aggregation tool.

Advantageously, the present techniques are designed to provide modularity and expandability; to scale with different metrics depending on what capability needs to be expanded as the solution requirements grow; and to scale, enabling customers the flexibility to conduct capacity planning sessions to ensure that the scaling and growth of the system meets changing needs. Specifically, by separating the computing system 200 into multiple network layers 204 enables creating individual layers 204 that include arrangements suitable for the function of each layer. For example, the black network layer 204-A can be horizontally scaled via the incorporation of the load balancers 214, the switches 214 and the firewalls 216. The gray network layer 204-B can be configured differently, to include the switches 212, the IPS 230, and the firewalls 216. All of the layers can be vertically scaled, as well, to include continuous monitoring 226 and OOBM servers 220, and one or more offline networks, such as the offline network 204-D.

The system 200 may include additional/different components, in some embodiments. For example, the system 200 may include one or more hardware security module (HSM), such as a SafeNet Luna 1700. The system 200 may include one or more red and gray CSfC OCSP responder (e.g., a CertAgent Dhuma OCSP Responder), a gray network authentication server (e.g., an Aruba ClearPass), a gray network EUD VPN client (e.g., an Aruba VIA VPN client), a red network EUD VPN client (e.g., a Cisco AnyConnect VPN client), etc.

Exemplary System Architecture Embodiments

The system 200 may be embodied as a system of systems (i.e., as a nested, composed or recursive system). In operation, the system 200 may encompass a connectivity subsystem that transports a CDA MILS client connection. This connection enables VDI sessions to be established with individual VDI subsystems within one or more security enclave, such as SIPRNet. The MILS subsystem is modular and provides the capability for additional VDI subsystems to be added. Additionally, a continuous monitoring subsystem 226 provides a detailed and accurate view of the network traffic as it flows across the system and includes log data in an aggregated dashboard. The components of the system 200 may be managed from a dedicated OOBM subsystem.

The SCRAaaS MACP design depicted in FIG. 1 enables many users (e.g., 2,000 or more) of EUDs 102 to connect via the environment 100. This capability may be provided by configuring each subsystem to support certain capacity or throughput requirements based upon the needs of the user of the EUD 102.

Advantageously, the design of the environment 100 and the system 200 provide a fault-tolerant/high availability architecture by including components that can absorb software or hardware failures without impacting the posture of the subsystem to which they belong. For example, the environment 100 and the system 200 includes firewalls (e.g., Palo Alto Networks firewalls) that enable high availability and fault tolerance by providing redundancy and failover capabilities. Selections of high quality components pervade the design of each of the subsystems. The present techniques utilize a broad spectrum of components to provide a multi-tiered approach to hardware, thereby safeguarding confidentiality, integrity, and availability of services.

The system 200 is designed to be expandable to enable further bandwidth, user base, and system growth. For example, as the user requirements increase, and contract modifications are executed, capacity can be added to the system to scale up to many (e.g., 15,000 or more) users. The present techniques provide a holistic solution that will support SIPRNet, NIPRNet, and future MPEs. The system 200 may be implemented as an end-to-end high availability and fully fault-tolerant solution that supports failover and secured operating environment among network segments. Due to the modular capability of the system 200, additional capabilities can be added to the system 200 with minimal impact on the operation of the system 200. In some embodiments, the system 200 may include instructions for verifying that certificates are issued by a particular certificate authority (e.g., a government authority, a corporate authority, etc.) and to properly revoke certificates according to compliance guidelines.

Figure 8A:
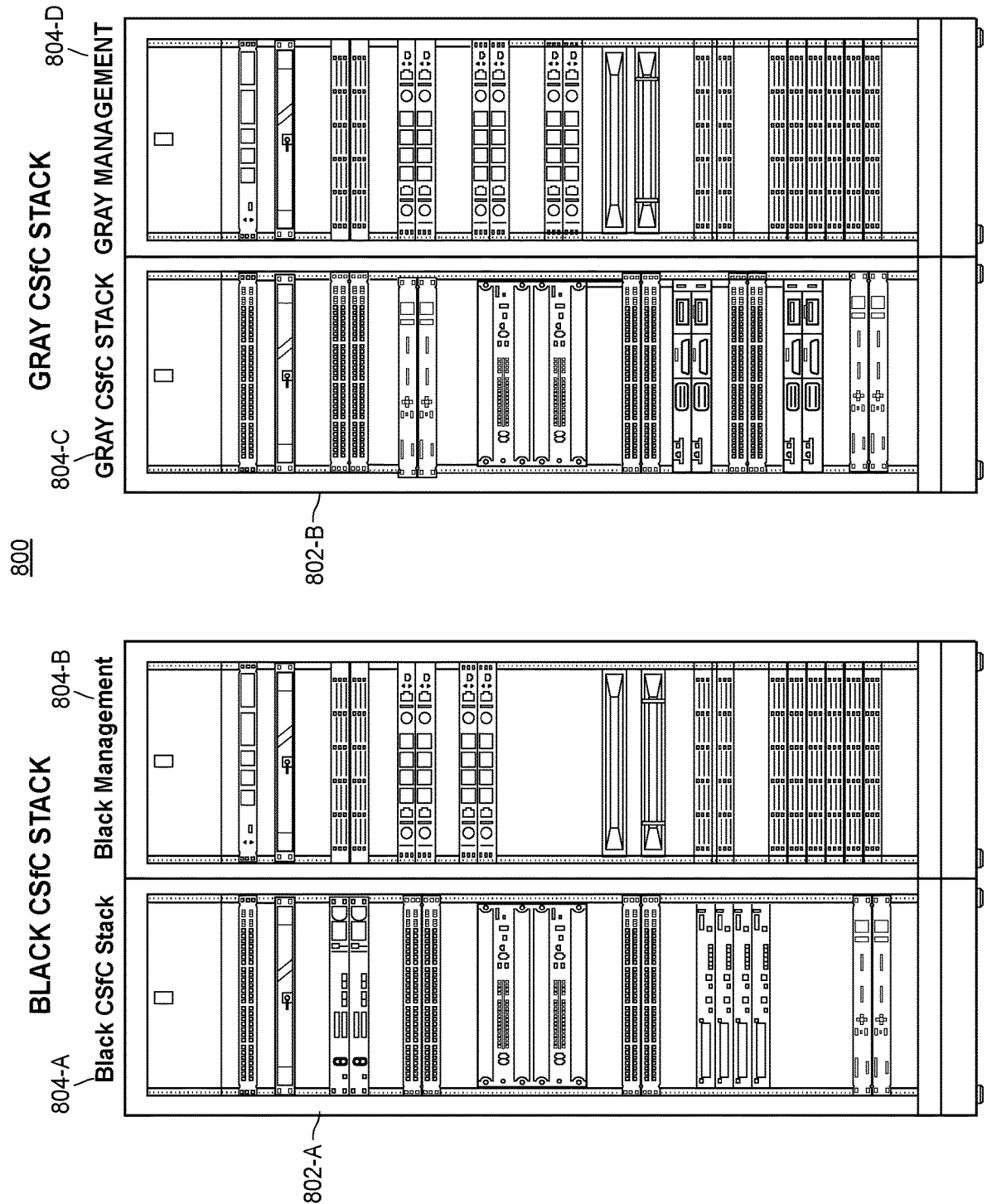
FIG. 8A depicts an exemplary computing environment for implementing commercial solutions for classified program computer systems, according to one embodiment and scenario.
Figure 8B:
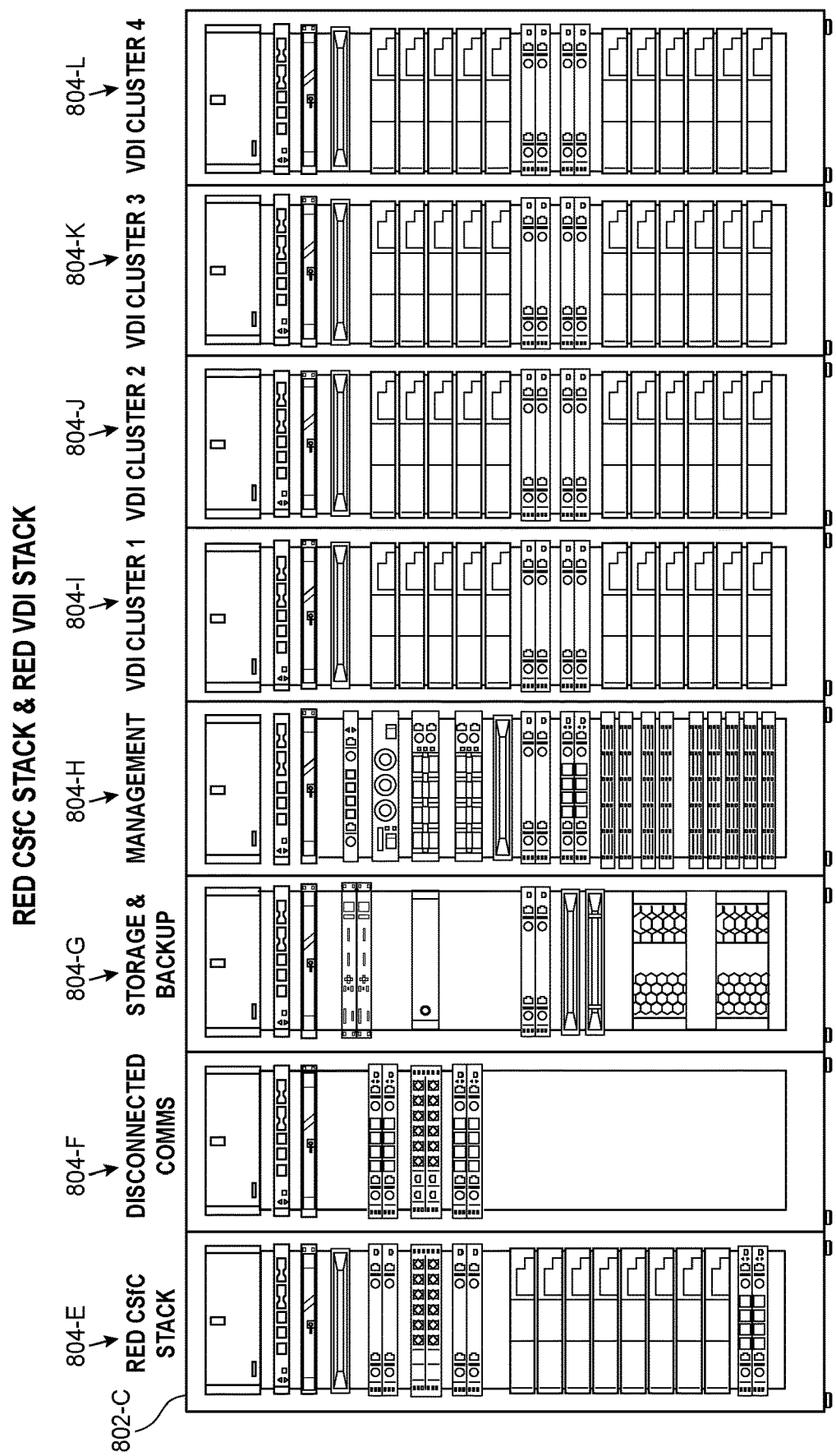
FIG. 8B depicts exemplary hardware stacks for implementing commercial solutions for classified program computer networks and virtual desktop infrastructure computer networks, according to one embodiment and scenario.

In general, the architecture of the system 200 enables the expansion of inter-connections for geographically disparate data centers while maintaining a fault tolerant solution. The system 200 achieves this scalability by validating significant port density and bandwidth growth throughout the system 200 supports future growth outlined by the Government's PWS. Additionally, the system 200 may be configured to enable Data Center Interconnect (DCI). The system 200 may be seamlessly expanded to encompass multiple data centers or to span geographic areas, for example, by utilizing data center capabilities (e.g., VMware NSX-T product, Cisco Nexus switching underlay, etc.). As noted, the system 200 is designed to scale. For example, additional network equipment can be added as requirements (e.g., NETCOM mission requirements) evolve, as also depicted in FIG. 8A and FIG. 8B.

The system 200 may be configured to include significant initial network bandwidth capabilities (e.g., 25 Gbps for each OOBM server 220, each virtualization server cluster 330 to virtual and physical switching components, a 100 Gbps backbone for each switch-to-switch communication link, etc.). Advantageously, the scaling and high bandwidth configuration are accomplished while maintaining a secure management plane by restricting access to management plane traffic for each network enclave to the OOBM transport architecture, as discussed below.

Exemplary Virtual Desktop Infrastructure Subsystem Design and Architecture

Figure 3:
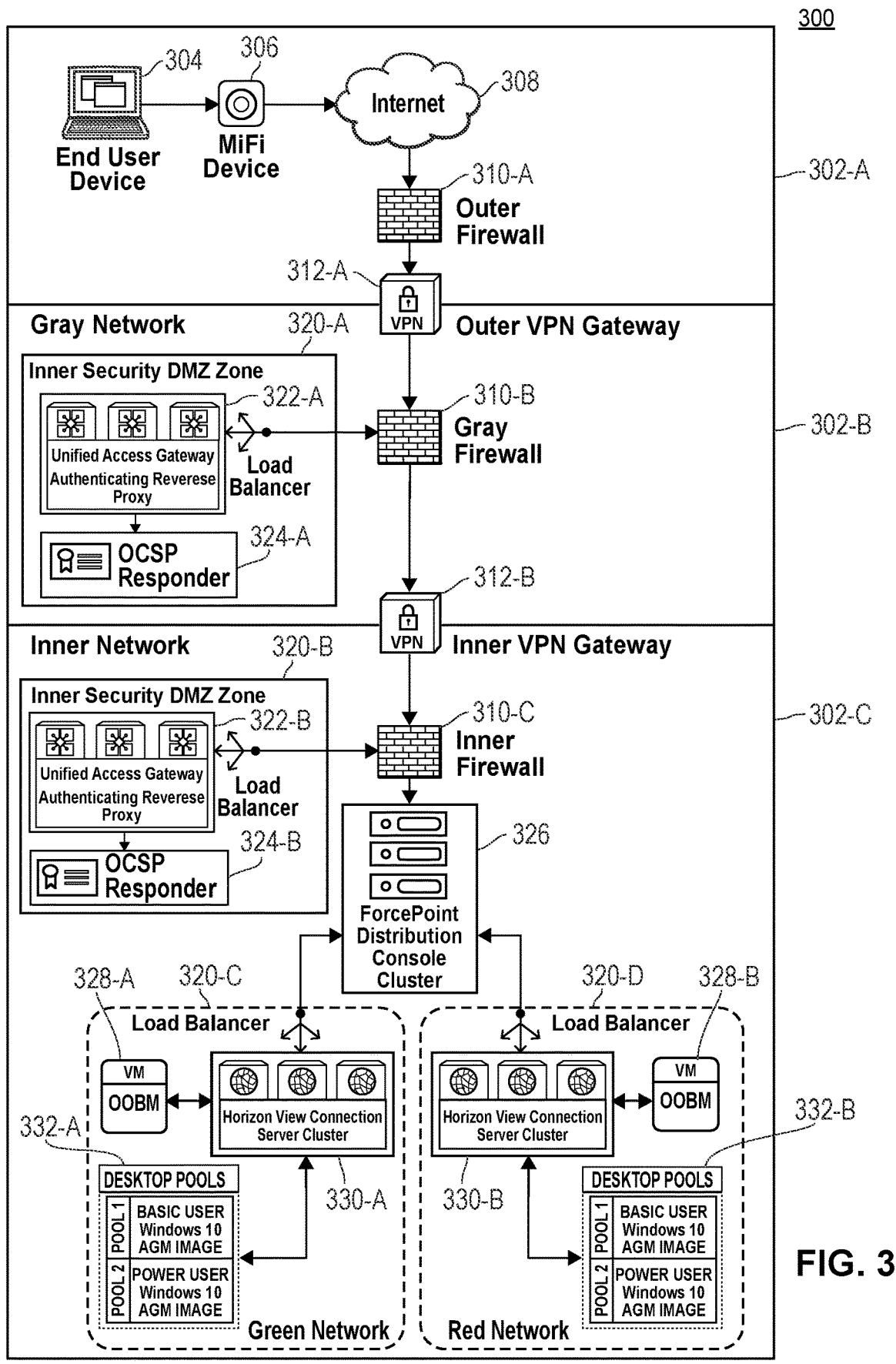
FIG. 3 depicts an architectural diagram of an exemplary virtual desktop infrastructure subsystem, according to one embodiment.

FIG. 3 depicts an exemplary VDI subsystem 300, according to one embodiment. The VDI subsystem 300 and the components therein may correspond to the system 200 and the environment 100, and respective components therein, in some embodiments. For example, the VDI subsystem 300 includes a black network 302-A, a gray network 302-B and an inner network 302-C that may correspond, respectively, to the black network 204-a of FIG. 2B, the gray network 204-B of FIG. 2B, and the online red network 204-C and/or the offline red network 204-D of FIG. 2B, in some embodiments. Similarly, the black network 302-A, the gray network 302-B and the inner network 302-C of FIG. 3 may correspond, respectively, to the outer firewall region 110-A, the gray firewall region 110-B, and the inner firewall region 110-C of FIG. 1, in some embodiments. In some embodiments, the networks 302 may be communicatively coupled to one another, directly and/or indirectly.

The black network 302-A of the VDI subsystem 300 may further include an EUD 304, a MiFi device 306, a black network 308 and a black firewall 310-A. The EUD 304 may be a TTC, as discussed above, and may be located in any location (e.g., at an overseas forward operating base). The MiFi device may provide network connectivity to the EUD 304, in some embodiments. The network 308 may be any computer network, comprising public, private and/or government nodes (e.g., the Internet). The black firewall 310-A may correspond to the black firewalls 216 of FIG. 2A, in some embodiments.

The gray network 302-B of the VDI subsystem 300 may further include an outer VPN 312-A, a gray firewall 310-B, an inner security DMZ 320-A including a load balancer 322-A and an OCSP responder 324-A. The outer VPN 312-A may correspond to the outer encryption controllers 218 and switches 212 of FIG. 2B, in some embodiments. The gray firewall 310-B may correspond to the gray firewalls 216. The inner security DMZ 320-A may include a unified access gateway and authenticating reverse proxy, accessed by the load balancer 322-A. The OCSP responder 324-A may verify the revocation status of EUD certificates within the gray network 302-B.

The red network 302-C of the VDI subsystem may include an inner VPN 312-B, a red firewall 310-C, an inner security DMZ 320-B including a load balancer 322-B and an OCSP responder 324-B. The inner VPN 312-B may correspond to the inner encryption nodes 238 and the switches 212 of FIG. 2C, in some embodiments. The red firewall 310-C may correspond to the firewalls 216 of FIG. 2C. The inner security DMZ 320-B may include a unified access gateway and authenticating reverse proxy, accessed by the load balancer 322-B. The OCSP responder 324-B may verify the revocation status of EUD certificates within the red network 302-B.

The red network may further include one or more distribution console clusters 326 that may correspond to the distribution consoles 240 of FIG. 2B, in some embodiments. The distribution console clusters 326 may be communicatively coupled to the red firewall 310-C, and to a green network 320-C(e.g., NIPRNet) via a load balancer, wherein the green network 320-C includes an OOBM virtual machine 328-A, a virtualization server cluster 330-A, and a desktop pool 332-A including one or more desktop images. The distribution console clusters 326 may be further communicatively coupled to a red network 320-D (e.g., SIPRNet) via a load balancer, wherein the red network 320-D includes an OOBM virtual machine 328-B, a virtualization server cluster 330-B and a desktop pool 332-B including one or more desktop images. Via the distribution console clusters 326, the user of an EUD may access one or more network images. In this way, a user who seeks to access a plurality of desktop images 332-A and a plurality of desktop images 332-B, for example, need not carry a plurality of desktop machines. Rather, the user may access the many desktop images via one credentialed thin client. Generally, the VDI subsystem 300 enables expansion and future growth of the system 200.

The VDI subsystem 300 is capable of supporting many (e.g., 2,000 users or more) on one or more networks (e.g., SIPRNet). In some embodiments, the VDI subsystem 300 may include additional clusters, enabling user growth to be scaled horizontally. As depicted in FIG. 3, the EUD 304 supports NIPRNet and SIPRNet VDI given the VDI subsystems and infrastructure to the respective network exist. This support can occur without changes to the EUD 304. Further, access can be granted or revoked without changes to the EUD 304.

Further, the VDI subsystem 300 provides VDI functionality that can be persistent or non-persistent in nature, and grants access to multiple classifications using the EUD 304. Enabling a persistent VDI session for designated users allows the users to personalize their desktop image 332, such that any changes will remain even after the user logs off of the EUD 304. On the other hand, a non-persistent VDI session will connect users to a generic desktop image 332 and allow no changes to be saved. This solution offers the VDI subsystem 300 reduced overhead and flexibility, to support users who will be doing minimal tasks or accessing the system less frequently.

In some embodiments, the VDI subsystem 300 provides a secure computing environment that will enable or restrict USB pluggable devices to access the virtual desktops 332. For example, by implementing the VMware Horizon Dynamic Environment Manager (DEM) and using Windows Group Policy Objects (GPOs), some embodiments ensure that EUDs can only access pre-approved/authorized USB media and peripherals such as webcams, mice, or docking stations.

The VDI subsystem 300 may support assigning the EUD 304 to one or more profiles. For example, the VDI subsystem 300 may include instructions for assigning the EUD 304 to aa basic user profile (e.g., a device that may utilize basic applications such as Microsoft Office, Microsoft Edge, Directory Services, etc.). In some cases, the VDI subsystem 300 may assign the EUD 304 to a power user profile (e.g., a device that may utilize a pre-approved list of more advanced applications). Profiles may be assigned on a per-user or per-EUD basis. Each profile may be provided additional backend assets, such as an NVIDIA GPU grid license to enable high resolution (e.g., 4k or higher) multiple monitor support when required. Different user profiles in the desktop images 332-A may be assigned a variable amount of virtual processors (VCPUs), virtual RAM, virtual hard disk space, etc.

In operation, the VDI subsystem 300 provides end-to-end authentication, via centralized and managed identity management for user authentication services. Successful authentication may be required to access any VDI desktop image 332. In some embodiments, the desktop images 332 may consist of Army Gold Master (AGM) images, to enable all facets of DoD layered authentication applications and requirements. Further, in some embodiments, the VDI subsystem 300 (and other components of the system 200) may include Federal Information Processing Standard (FIPS) 140-2 compliant hardware/software components that directly support the VDI subsystem 300.

In some embodiments, the VDI subsystem 300 enables the EUD 304 to access a local VDI session when the EUD 304 is at a particular location (e.g., at a secure government facility, corporate facility, etc.). The subsystem 300 may include instructions for determining the location of the EUD 304. In some embodiments, the VDI subsystem 300 may enable the 302 to a VDI session when the EUD 304 is outside of a secure facility. The VDI subsystem 300 may prevent access to the VDI subsystem 300 by assigning a clearance level to users and/or to the EUD 304. The subsystem 300 may be configured to adhere to standardized security controls (e.g., DoD Common Criteria, NIST 800-53, DISA STIGs, etc). Additionally, the VDI subsystem 300 may prevent a VDI image from the desktop pool 332 from being displayed on the EUD 304 by using one or more suitable authentication mechanisms (e.g., CAC, media access control (MAC) address filtering, Internet Protocol (IP) addressing, secured MiFi devices, etc).

In some embodiments, the VDI subsystem 300 may include an appliance (e.g., a Rubrik 6400) configured to provide data management for backup, recovery, data archival, and/or disaster recovery capabilities throughout the environment 100 and the system 200. The appliance may deliver near-zero recovery point objective (RPO) and recovery time objective (RTO) for the profile data belonging to the user of the EUD 304, and operational datasets with natively integrated continuous data protection for the VDI subsystem 300. Like the subsystem 300, the appliance may be configured to adhere to standardized security controls/protocols.

The VDI subsystem 300 may include a framework that guides the process for establishing secure access for users of the EUD 304 to desktops 332 that meet various federal compliance requirements. In some embodiments, the framework may include a VMware validated Mobile Secure Workplace framework for Federal Secure Desktops. Thus, the VDI subsystem 300 is advantageously configured to support end user mobility, and to streamline application updates, enhance data security, and deliver a high-fidelity user experience while maintaining proper profile data protection to enable security of personal privacy information. In still further embodiments, the VDI subsystem 300 may include an environment manager (e.g., a VMware Dynamic Environment Manager (DEM)), to simplify end user profile management. The environment manager enables personalization and dynamic policy configuration across any virtual, physical, and/or cloud-based desktop environment (e.g., Windows, Linux, Mac OSX, etc.). This advantageously enables the user, whether corporate, governmental or personal, to add new application sets to desktops 332 efficiently and securely.

The OOBM virtual machine 328-A and the OOBM virtual machine 328-B may be part of an OOBM transport architecture also comprising the OOBM servers 220 of FIG. 2A, FIG. 2B and FIG. 2C. The virtual machines 328 may be communicatively coupled to the OOBM servers 220 via the networks links between the networks 302. The OOBM transport architecture supports DAR, and enables management of devices within the system 200 including DAR devices (e.g., the switches 212). The OOBM transport architecture may forward datasets for continuous monitoring requirements.

The VDI subsystem 300 includes configuration designed to significantly improve user experience. For example, the OCSP responders 324 located within the gray network 302-B and the inner network 302-C deliver optimal performance, high availability, load balancing, and certificate validation simplicity. The strategic placement of the OCSP responders 324 in the network ensures that the VDI subsystem 300 has efficient operations while decreasing the burden to the network and client resources to enable faster logon for the EUDs 304.

End User Device Design Embodiments

Figure 4A:
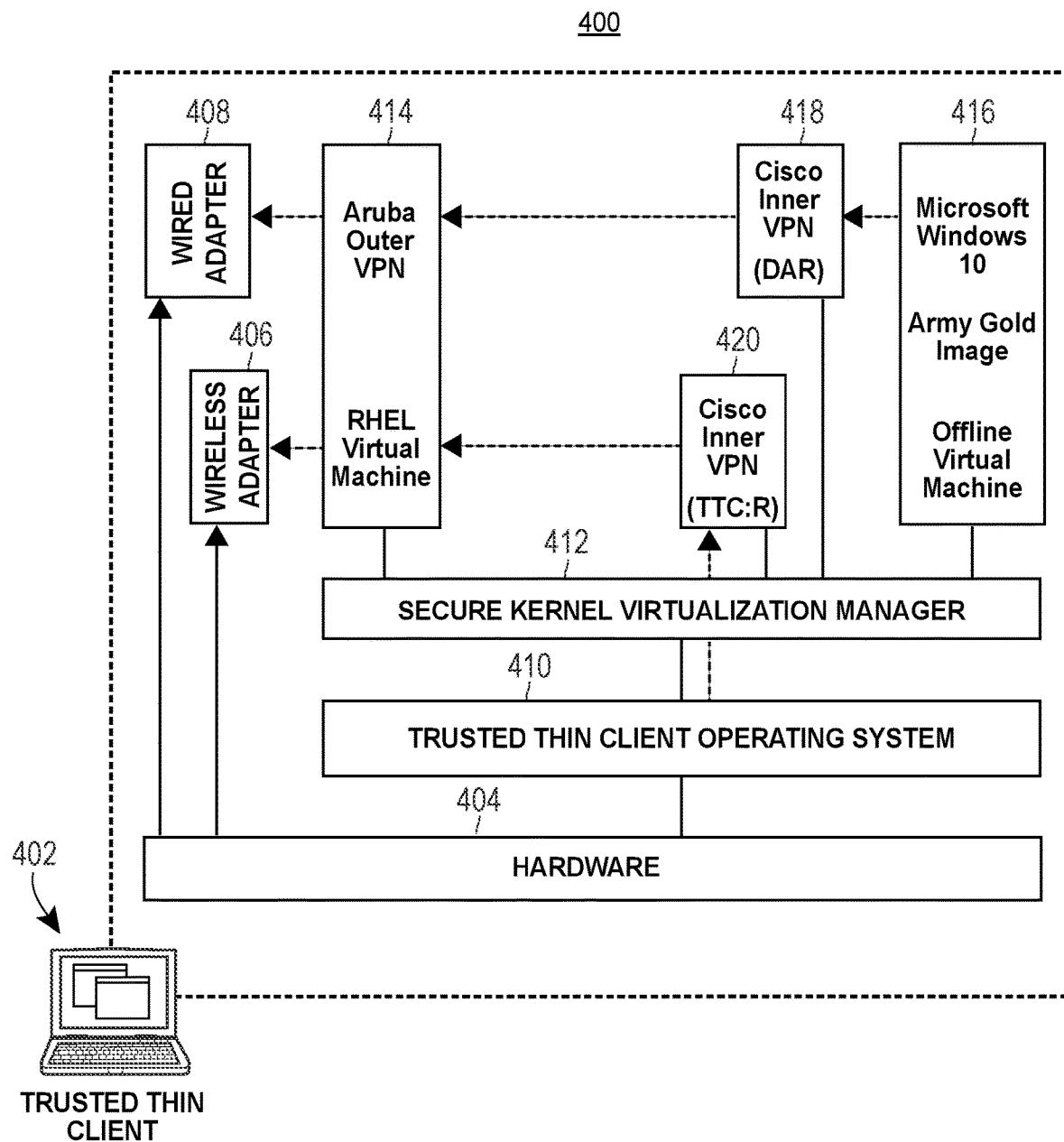
FIG. 4A depicts a block diagram of an exemplary end-user device operating in a first mode, according to one embodiment.
Figure 4B:
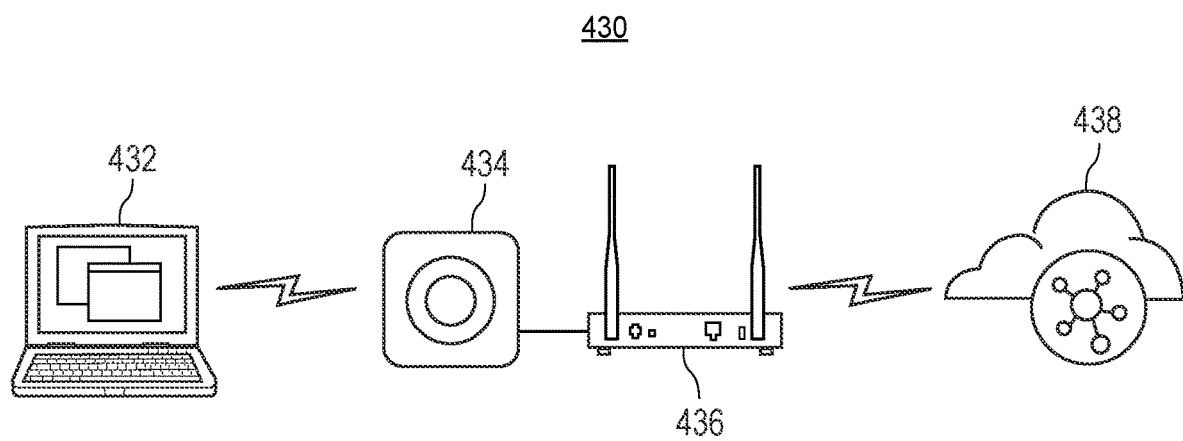
FIG. 4B depicts a block diagram of an exemplary end-user device operating in a second mode, according to one embodiment.

Turning to FIG. 4A and FIG. 4B, additional configurations, embodiments and scenarios of the EUD 304 of FIG. 3 and/or the EUDs 202 of FIG. 2A will now be described in greater detail. Generally, in the present techniques end-user devices may be operated in multiple modes.

FIG. 4A depicts a block diagram 400 depicting an EUD 402 operating in a first mode, according to an embodiment and scenario. The EUD 402 may correspond to the EUD 102 of FIG. 1, EUD 202 of FIG. 2A and/or the EUD 304 of FIG. 3, in some embodiments. As discussed above, the EUD 402 may be a thin client, in some embodiments. The EUD 402 includes hardware 404. As discussed above, the EUD hardware 404 may include computer hardware (e.g., an input device, an output device, a keyboard, a mouse, a trackpad, transitory and/or non-transitory memory, one or more processors, etc.).

The hardware 404 may include a wireless adapter 406 and/or a wired adapter 408. The EUD 402 may further include a TTC operating system (OS) 410. For example, the TTC OS 410 may be a UNIX operating system, a GNU/Linux operating system, a Microsoft Windows operating system, etc. The TTC OS 410 may include a secure kernel virtualization manager (KVM) 412 (e.g., AMD Secure Encrypted Virtualization (SEV)). The secure KVM 412 may access one or more VMs (e.g., RedHat Enterprise Linux (RHEL) VMs). The VMs may employ Security-Enhanced Linux (SELinux). For example, the present techniques provides customers with the capability of MILS in end-user devices. Specifically, by utilizing MILS-mode SELinux, the end-EUD 402 (for example) operating system is enabled to control access between different classifications and labels. This protection and many other security controls allow the EUD 402 to utilize MILS capabilities in conjunction with the distribution consoles 240 of FIG. 2C.

The secure VMs 414 may interface with the adapter 406 and/or the adapter 408, and may include links to an outer VPN (e.g., the outer VPN 312-A of FIG. 3) and one or more inner VPNs, such as a DAR VPN 418 and/or a TTC remote VPN 420. For example, the outer VPN may be accessible via the online red network 204-C and the inner VPN may be accessible via the offline network 204-D.

In operation, the secure KVM 412 may function to enable the EUD 402 to run a local instance of a VM 416 (e.g., an online RHEL VM, an offline AGM Windows 10 VM, etc.) for local services and applications on the EUD 402. Configuring the EUD 402 to use a RHEL VM and FIPS 140-2 compliant VPN clients (e.g., Aruba VIA, Cisco AnyConnect, etc.) may be particularly advantageous for governmental uses of the present techniques, because the use of FIPS 140-2 compliant software ensures that the present techniques provide a secure and compliant EUD VM image compatible with the system 200 and the VDI subsystem 300.

Specifically, adherence to all FIPS 140-2 compliant operating systems and software guidelines may be monitored during all phases of installing VMs, hypervisors, and virtual operating environments. With reference to FIGS. 2A-2C and FIG. 3, to ensure FIPS 140-2 adherence, all facets of the information system including the system 200 and VDI subsystem 300 may be installed, configured, and tested for FIPS 140-2 compliance. Further, application of the appropriate security configurations may be monitored by utilizing automation, Security Content Automation Protocol (SCAP) scans, and capabilities in the continuous monitoring servers 226 and OOBM servers 220.

The ability of the secure KVM 412 to run the VM 416 may be limited, as above, to offline circumstances. For example, in some embodiments, this capability will only be enabled on 20% or less of approved government EUDs, and may only be used when the approved EUDs cannot access a particular network (e.g., DoDIN). Use of the VM 416 may be further limited by user type (e.g., not available except to NETCOM-approved users). As noted above, the mode depicted in FIG. 4A may be the only mode that allows for writes to occur on the EUD 402, and the mode may include multiple data security aspects.

Specifically, the EUD 402 operating in the first mode may have the ability to run a local VM that can contain data at rest. This device may require additional VMs to be installed on the EUD 402. The OS of the EUD 402 may be configured with LUKS encryption and Trusted Platform Module (TPM) security controls. In some cases, all VMs that are deployed on the EUD 402 may have the same encryption profile as the OS. The EUD 402 may require additional configuration, as described below.

For example, in some embodiments, the EUD 402 may include instructions that cause a data synchronization event to occur in response to a network change. For example, the EUD 402 may include instructions for monitoring the adapter 406 and/or the adapter 408 and, when an EUD 402 running the offline VM 416 joins a network, or regains network access, for generating one or more nested independent network tunnels that act as a pathway for user data to be transferred back to a particular network component (e.g., the SIPRNet enclave 244).

Furthermore, the EUD 402 may be configured to store local data securely. Examples of data storage layers may include BitLocker in the AGM VM and drive encryption both at the software level (e.g., via Linux Unified Key Setup (LUKS)) and hardware level (e.g., via Opal Self-Encrypting Drive (OPAL-SED) drive encryption). The DAR capability ensures proper data segmentation and compliance with all security practices while enabling users to continue operations even when the EUD 402 lacks connectivity to a secure network (e.g. DoDIN). The EUD 402 supports connections to both local and remote VDI sessions.

FIG. 4B depicts a block diagram 430 depicting an EUD 432 (e.g., a Dell 7400 series laptop) operating in a second mode, according to one embodiment and scenario. The EUD 432 may correspond to the EUD 402 of FIG. 4A, in some embodiments.

In the second mode, the present techniques may be configured to limit authentication of end-user devices. For example, the end-user device (e.g., the EUD 304) may limit authentication to devices located at a particular data center location. In some embodiments, the present techniques may be configured to limit use of virtual desktop hosted remotely at a particular data center. In the second mode, no data (classified or otherwise) is stored locally on the EUD. With reference to FIG. 3, the EUD 304 operating in the second mode may be a read-only computing environment, including instructions limited to displaying the remote virtual desktop 332 for the user to interact with.

The block diagram 430 further includes a retransmission device 434 (e.g., a NETGEAR MR1100 MiFi device), an end-user home router 436 providing access via an internet service provider (ISP) to end-user home internet service 438.

The second mode may be a disconnected communications design embodiment. Specifically, in the second mode, the EUD 432 may not have any data at rest when the EUD 432 is in a local or connected mode. The OS of the EUD 432 may include a secured read-only filesystem, and may only display the respective frontend VDI image for which the distribution console (e.g., the distribution console 240 of FIG. 2C) is connected.

The second mode may require the addition of a second inner red CSfC VPN stack, including independent cryptographic certificates. This second CSfC VPN stack, that may correspond to an offline network (e.g., the offline red network 204-D) in some embodiments, is configured to provide connectivity capability to an offline VM (e.g., the VM 416 of FIG. 4A). With reference to FIG. 4A, in the second mode, all connectivity from the secure VMs 414, the DAR VPN 418 and the TTC remote VPN 420 (i.e., network tunnels) may be physically isolated from accessible VPN gateways. The second mode supports differentiating EUDs 432 and user profiles, to distinguish between device types and to provide different levels of service, as discussed above.

The present techniques include a third mode, including still further access restrictions. In the third mode, the EUD 432 is limited to connecting to black networks via a provided wireless network, a provided cellular network, a dedicated outer VPN, or a retransmission device (e.g., the retransmission device 434). For example, in the third mode, with reference to FIG. 4A, the TTC OS 410 may be hardened to prevent any user of the EUD 402 from directly accessing the underlying OS of the EUD 402. By implementing the proper security controls on the EUD 432, the present techniques advantageously prevent installing applications or modifying any settings to include security settings on the EUD 432. In some third mode embodiments, the EUD may be configured to only connect to peripherals such as external keyboards, mice, displays, docking stations, and approved common access card readers. Still further, the EUD 432 may be configured to prohibit removable media usage either through configuration, policy and/or physical modification.

Exemplary Mobile WiFi (MiFi) Hotspot Embodiments

As noted above, a primary advantage of the present techniques is the facilitation of mobile computing, in a secure fashion, and the ability to allow the end user to access multiple desktop environments via a single thin client device. A MiFi device may be provided along with the thin client computing end-user device to facilitate the network access to the VDI described above.

Figure 4C:
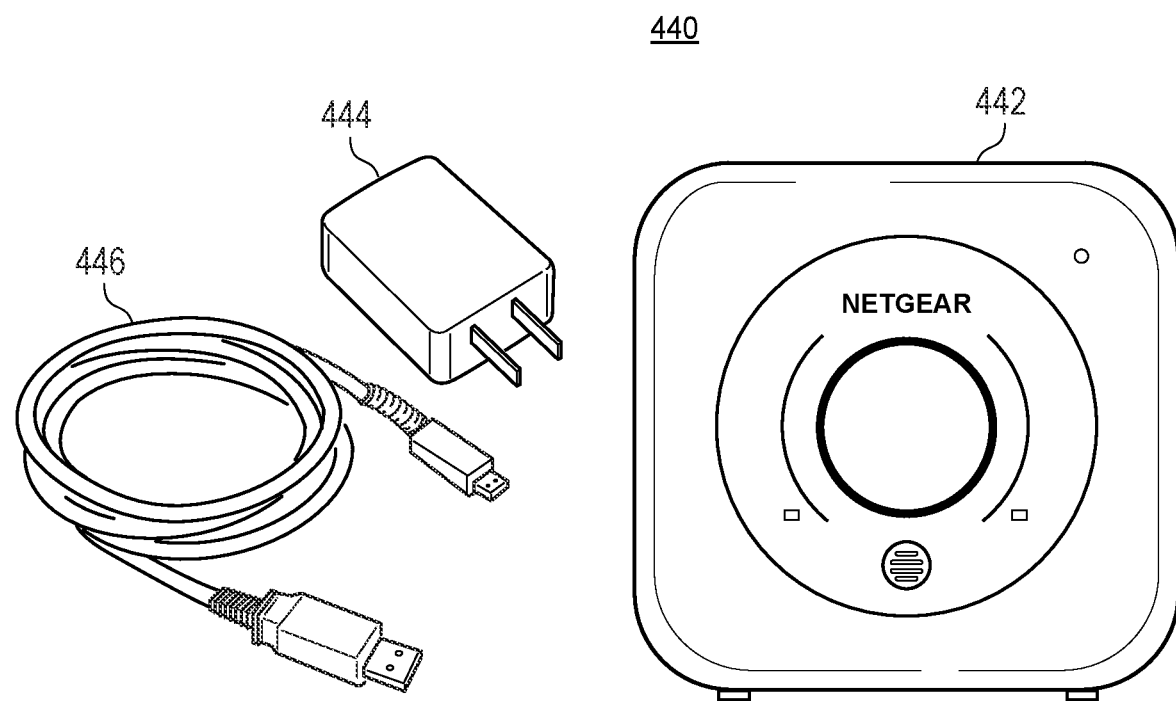
FIG. 4C depicts an exemplary computing environment, according to one embodiment.

Turning to FIG. 4C, an exemplary computing environment 440 is depicted that includes a MiFi device 442 having a power cable 444 (e.g., an alternating current cable) and a data cable 446 (e.g., a USB Type-C cable). The MiFi device 442 may be configured to meet NSA approved requirements. In some embodiments, the MiFi device 442 will be owned by the end user (e.g., a corporate or government entity). For example, the MiFi device 442 may be a mobile router (e.g., a NETGEAR Nighthawk M1) that satisfies retransmission device requirements within the NSA CSfC MACP. The MiFi device 442 may be unlocked and used with a cellular provider (e.g., AT&T, Verizon, etc.). The MiFi device 442 may include a router and lithium ion battery.

When configured in compliance with the NSA CSfC MACP retransmission device requirements, the MiFi device 442, or another suitable device, allows network traffic to and from the EUD 432 of FIG. 4B to traverse the public Internet to connect to outer encryption components (e.g., the external switch 212-A) even when the MiFi device 442 is not connected to the DoDIN-A.

Exemplary Solution Overview Embodiments

Figure 5A:
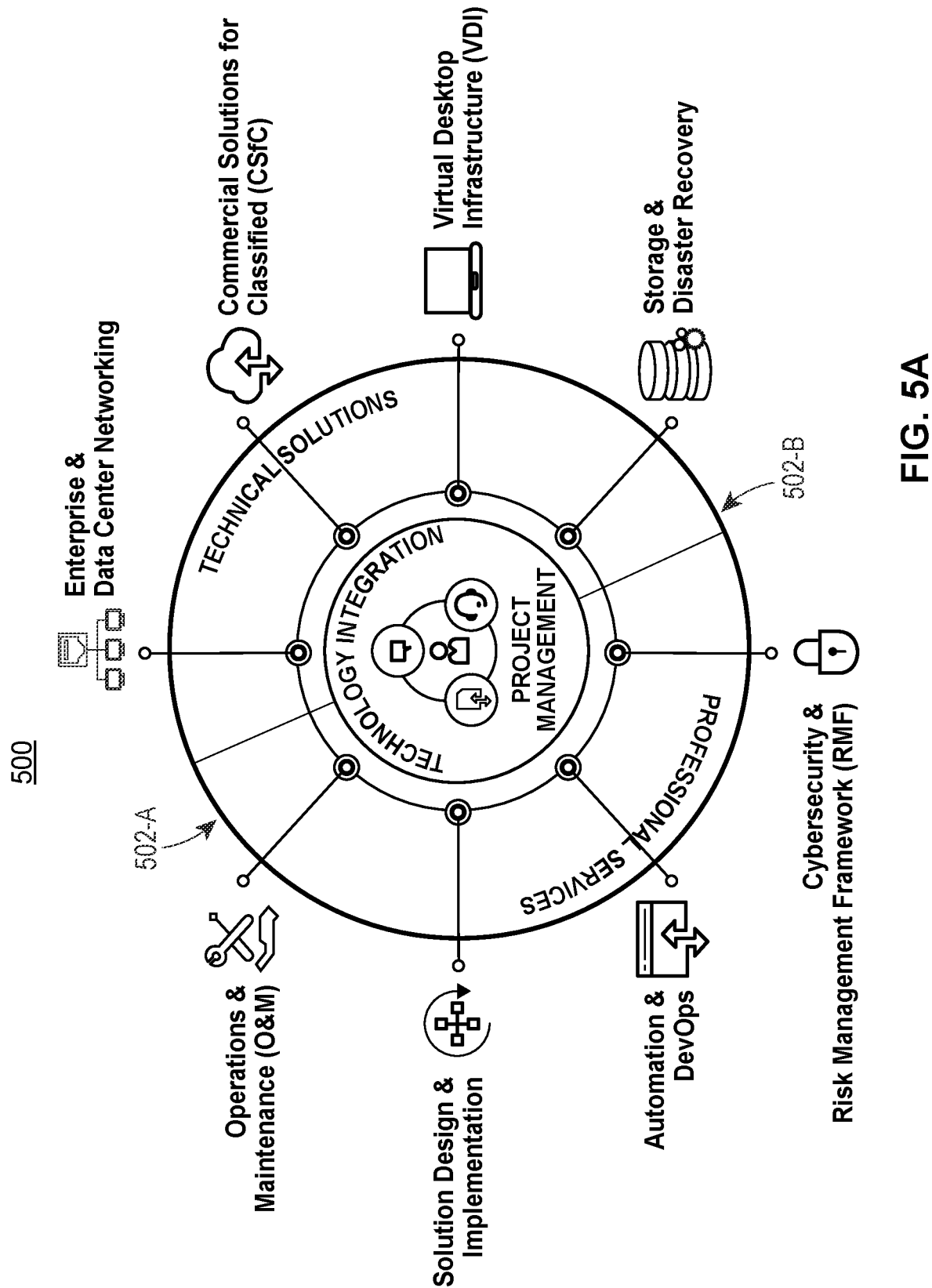
FIG. 5A depicts an exemplary solution overview process for technology integration and project management, according to one embodiment and scenario.

FIG. 5A depicts an exemplary solution environment 500 for technology integration and project management, according to one embodiment and scenario. The solution environment 500 includes a professional services subprocess 502-A and a technical solutions subprocess 502-B.

Generally, the solution environment 500 may leverage multiple technologies to future proof remote access of SIPRNet and NIPRNet, while following security requirements outlined by NSA guidance. The solution overview process may include coordinating NSA registration for CSfC MACP through the CSfC PMO. The solution overview process may include facilitating implementation for Assessment and Authorization (A&A) documentation through the Army Cross Domain Management Office (CDMO). In general, the solution environment 500 may enable navigation of government requirements. The solution environment 500 may enable the company to support large-scale information technology service operations by delivering DaaS support to government and/or corporate customers for a large number of devices (e.g., 600,000 devices or more per customer).

The solution environment 500 may be implemented by the company acting in its capacity as a civilian contractor. For example, the company may have working relationships with major suppliers in the technology industry, wherein such partners have full-time representation at the company's sales offices to facilitate requests for information and to assist with designing the best possible solution. The company may offer discrete hardware and software products and integrated technology solutions. The company may modify the solution for any potential future needs and ensure compliance with any updates to the CSfC Components List of the NSA or other policies (e.g., the Forcepoint hardware compatibility list). The company may provide reliable, streamlined access to hardware, software, warranty products and services required for the present techniques to include end user devices and MiFi equipment.

The professional services and technical solutions at the subprocess 502-A and the subprocess 502-B may include an end-to-end product lifecycle management process that provides accurate, timely and cost-effective technology acquisition of hardware, software and warranty services. Such processes may be governed by standards such as ISO 9001 Quality Management, ISO 14001 Environment Systems Management, ISO/IEC 20243 Open Trusted Technology Provider™ Standard, ISO 27001 Information Security Management and ISO 28000 Supply Chain Security Management. The subprocess 502-A may include cybersecurity and risk management framework (RMF), automation and development operations (DevOps), solution design & implementation, and operations and maintenance subsystems. The subprocess 502-B may include enterprise and data center networking, CSfC, VDI and storage and disaster recovery subsystems.

Exemplary Operations & Maintenance Embodiments

Figure 5B:
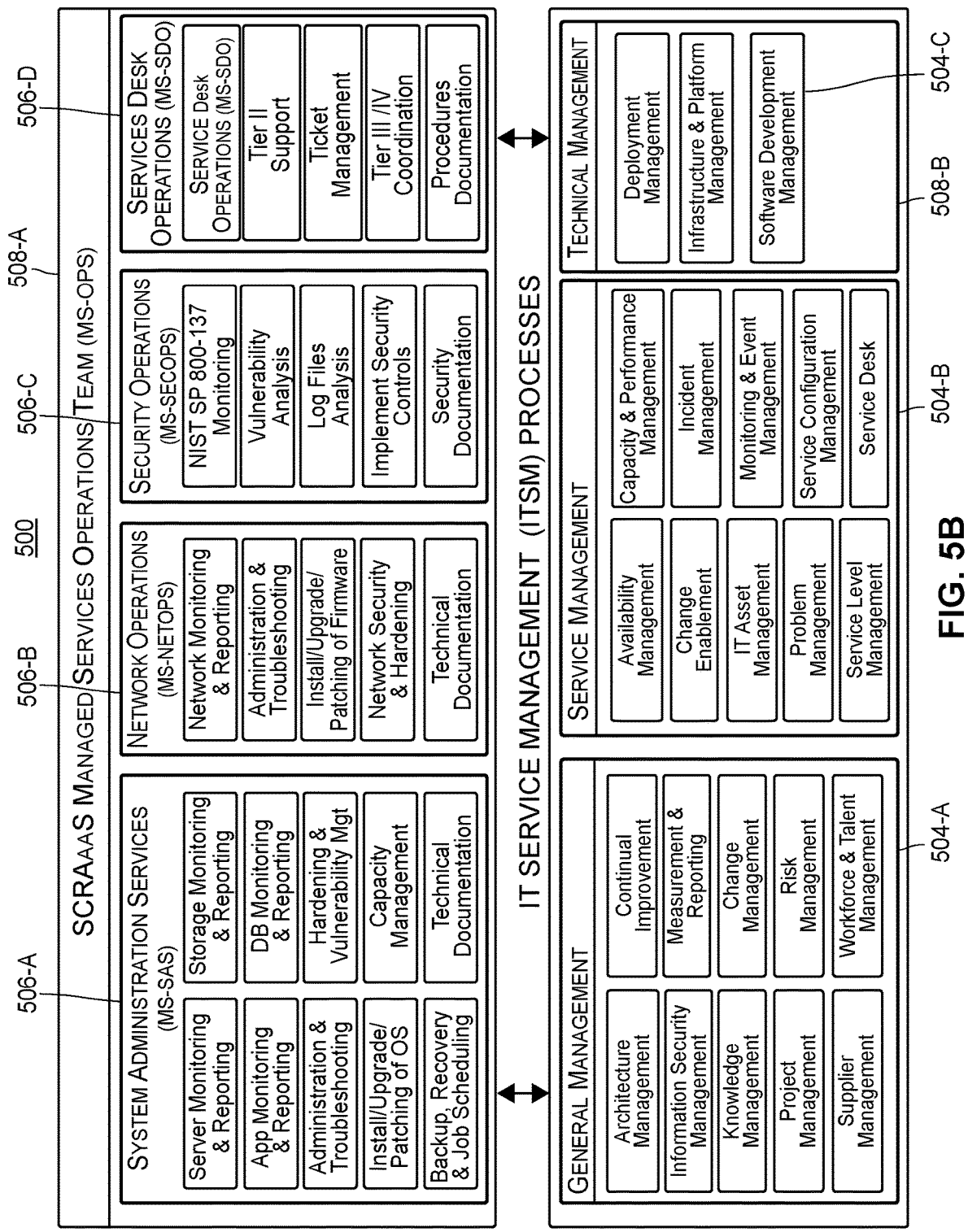
FIG. 5B depicts an exemplary block diagram depicting an operations and maintenance subsystem, according to one embodiment.

FIG. 5B depicts an exemplary block diagram depicting an operations and maintenance (O&M) subsystem within the solution environment 500, according to one embodiment.

The O&M subsystem may correspond to the O&M subsystem depicted in the subprocess 502-A of FIG. 5A, in some embodiments.

As noted above, cybersecurity demands for commercial solutions for classified information networks are not handled well by conventional systems. The O&M subsystem is designed to organize and solve these demands systematically, improving the likelihood that such demands are met in a real deployed system. Specifically, the O&M subsystem includes technology, consulting services, security, IT service management processes, and support services that add up to a turnkey SCRAaaS solution capable of supporting high-demand installations (e.g., NETCOM's NIPRNet and SIPR-Net mission requirements). The O&M subsystem may provide 24×7×365 onsite and remote technical and management support for all applications, OS software, and hardware devices attached to the SCRAaaS enterprise solution by providing system analysis, systems administration, programming, testing, implementation, documentation, security maintenance and testing (A&A) support, performance monitoring, remote monitoring, management and service desk support to assist users as necessary to resolve issues related to remote access via the CSfC solution.

The O&M subsystem may include a SCRAaaS managed services operations (MS-OPS) component 508-A. The MS-OPS component 508-A may include instructions for managing IT equipment procurement (e.g., order placement, tracking, shipping, and returns), as well as the management and governance of individual functions that are responsible for providing system administrative services, network operations, security operations, information assurance security operations, and support services/help desk operations for the SCRAaaS solution. The MS-OPS component 508-A may include respective subcomponents, including a system administration services subcomponent 506-A, a network operations subcomponent 506-B, a security operations subcomponent 506-C and a service desk operations component 506-D. Each of the subcomponents 506 may include a plurality of respective routines that may be performed to affect the state of the SCRAaaS, as embodied, for example, by the environment 100.

The system administration services subcomponent 506-A may include instructions for providing Tier III-Tier IV technical support, for monitoring operations and maintaining all systems and virtual hosting environments for the migration, integration and operation of SCRAaaS infrastructure. The system administration services subcomponent 506-A may include documentation for approved changes, system diagrams, wiring diagrams, asset management, device configurations, and security documentation and associated artifacts to support security control implementation.

The network operations subcomponent 506-B may include instructions for providing Tier III-Tier IV technical support, for performs network vulnerability analysis, security monitoring, and reporting and documentation. The network operations subcomponent 506-B may include further instructions for coordinating, planning and implementing remediation of findings from the vulnerability analysis such as network device security hardening of network port access, iOS upgrades, access control lists (ACL), audit logging, physical access and admin console control, etc. The network operations subcomponent 506-B may include further instructions for monitoring the current state of the network and proactively notifying users of potential issues before they become an incident.

The security operations subcomponent 506-C may include instructions for implementing and designing security controls to protect SCRAaaS infrastructure and its contents. For example, the security operations subcomponent 506-C may include instructions for identifying suspicious and malicious activities, analyzing log files, analyzing SIEM reports, monitoring security controls (NIST SP 800-137), conducting vulnerability assessments for CSfC, VDI, MILS, and associated security and management provisioning systems, and for tracking and eradicating viruses and malicious code. The security operations subcomponent 506-C may include instructions for generating reports related to work activity including approved changes, network diagrams, system diagrams, log analysis, SCAP reports, ACAS reports, HBSS reports, vulnerability reports, device configurations, and security documentation and associated artifacts to support security control implementation.

The service desk operations component 506-D may include instructions for providing Tier II technical support to ensure applications are available and performing as expected and assist end users as necessary to resolve issues related to the CSFC/MILS/VDI enterprise solution.

The O&M subsystem may include additional subcomponents (not depicted). For example, the O&M subsystem may include a managed services architecture subcomponent that includes instructions for analyzing performance, reliability, and availability issues to determine possible solutions to remediate identified problems, and for analyzing new requirements to identify potential solution recommendations and the associated cost impacts to include hardware, software, and personnel. The managed services architecture may include instructions for generating technical, business, and functional requirements; functional test scripts; and solution architecture documents.

In some embodiments, the O&M subsystem may include a solution implementation subcomponent (not depicted). The solution implementation subcomponent may analyze onsite inventory, racking and stacking of hardware, installation of software, and the overall configuration of the solution. The solution implementation subcomponent may perform solution validation testing and execute solution testing instructions, and provide the results of such tests to a leadership team, and/or to the customer. The solution implementation subcomponent may further generate all solution deployment documents including, physical wiring diagrams, logical networking diagrams, routing diagrams, hardware configuration, software configuration, IP addresses, username and passwords, resource pools, operating system configurations, automation and orchestration configuration, security configuration, details supporting NSA capability package checklists, STIG checklists for applied STIGs, and solution deployment runbooks.

In still further embodiments, the O&M subsystem may include an information and security compliance subcomponent (not depicted) including instructions for implementing work-processes and tools used to maintain strategic risk management, personnel compliance with regulations (e.g., DoDD 8570/8140) and SCRAaaS solution compliance with NIST 800-53 security controls. The information and security compliance subcomponent may include further instructions for monitoring POA&M items, maintaining valid systems, certifications and accreditation authorizations, and for conducting vulnerability management. The information and security compliance subcomponent may include further instructions for generating security controls to protect the information systems, maintaining POA&M documentation, supporting Command Cyber Readiness Inspections, and responding to, complying with and supporting IAVA activities. The information and security compliance subcomponent may include still further instructions for developing and maintaining security documents and artifacts to support DoD RMF/Army A&A accreditations and NSA CSfC Registration, in some embodiments.

In sum, the organization and modularity of the solution environment 500, combined with well-defined policies and procedures provides a reliable, scalable, and secure solution, that improves on conventional techniques for provisioning VDI via SCRAaaS. The solution environment 500 further enables the present techniques to identify potential issues before they become a problem. The results further improve over conventional techniques, by reducing production issues and by enhancing security and system transparency to all parties, and by ensuring system enhancements are deployed in a timely manner. In a governmental context, the solution environment 500 ensures that the SCRAaaS techniques provided by the environment 100, for example, remain secure, viable, scalable and compliant registration standards (e.g., DoD cybersecurity, Army A&A, and NSA CSfC checklists).

An incomplete list of features and improvements supported by the present techniques are: Availability Management; Backup and Recovery, including Servers, Network Devices, Logs, User Profiles; Communication Management; Configuration Management; Change Management; Continuous Monitoring and Reporting; Disaster Recovery Continuity of Operations; Event Management; Incident Management; Knowledge Articles, End User Incident Support; Notification Management; Patching and Software Updates, including Servers, Network Devices, and Storage Devices; Performance Management; Performance Monitoring; Physical Security and Access and Operational Logs; Problem Management; Release Management; System Operations Security, including Access Controls and Password Management; System and Database Administration; Test and Lab Environment Management and Scheduling; Ticket Management, including Ticket Priority Structure and Escalation Procedures; and User Account Creation, Deletion and Reset, including Security Authorization Verification.

Exemplary Service Management Embodiments

The O&M subsystem may further include an IT service management process component, organized according to general management functions 504-A, service management functions 504-B and technical management functions 504-C. The present techniques may include instructions for analyzing the components 508 and the functions 504, to cause certain functions 504 to be performed with respect to one or more components 508.

For example, the present techniques may include instructions for automatically facilitating the NSA CSfC registration process by preparing and providing required deliverables (including registration forms, letters, etc.) for submission to NSA's CSfC Program Management Office, and for verifying requirements for compliance of the CSfC MACP and the CSfC DARCP. The instructions may automatically submit signed Capability Packages to NSA's CSfC PMO for the Mobile Access Solution Registration, DAR Solution Registration, and Key Management Requirements Annex within a given time period (e.g., ninety days) to ensure registration and accreditation by the NSA. The instructions may automatically store a registration number, and establish documents, including Compelling Evidence Documents, Completed Registration Form, Completed Compliance Checklist, Concept of Operations, Deviation Forms, Network Diagrams (Data Flow, Topology, and Others) and System Design Document.

The instructions may include rules for validating the SCRAaaS using the components 506 by analyzing existing DoD cybersecurity policy, guidelines, and operations to ensure that the SCRAaaS will maintain proper log storage and rotation management. For example, the security operations subcomponent 506-C may include instructions for rotating event logs after thirty days into long-term (e.g., one year) storage. The security operations subcomponent may include further instructions for offloading the logs to centralized SYSLOG servers and for performing continuous monitoring via a Security, Incident, and Event Manager (SIEM). The instructions may further forward solution system logs that include pre-determined criteria (e.g., all identification events, authentication events, unauthorized action events, user/super-user/administrative privilege escalation, certificate loading/revocation events, failure to download CRL, and CRL signature validation failure) to the SIEM for real-time monitoring of the solution. Additionally, in some embodiments, the present techniques may include customized dashboards (not depicted) that include all log entries and applicable information (e.g., event date/time, identifier, record event type, success/failure, failure codes, subject identity, source address, etc.).

With any production support operation, monitoring the server, network, and storage infrastructure, as well as hosted applications and logging mechanisms are essential. As noted above, conventional systems fail in this regard. Thus, the present techniques improve over conventional techniques by including an extensive portfolio of tools to provide in-depth monitoring capabilities. An overview of the continuous monitoring solution depicted in FIG. 6.

Exemplary Continuous Monitoring Embodiment

Figure 6A:
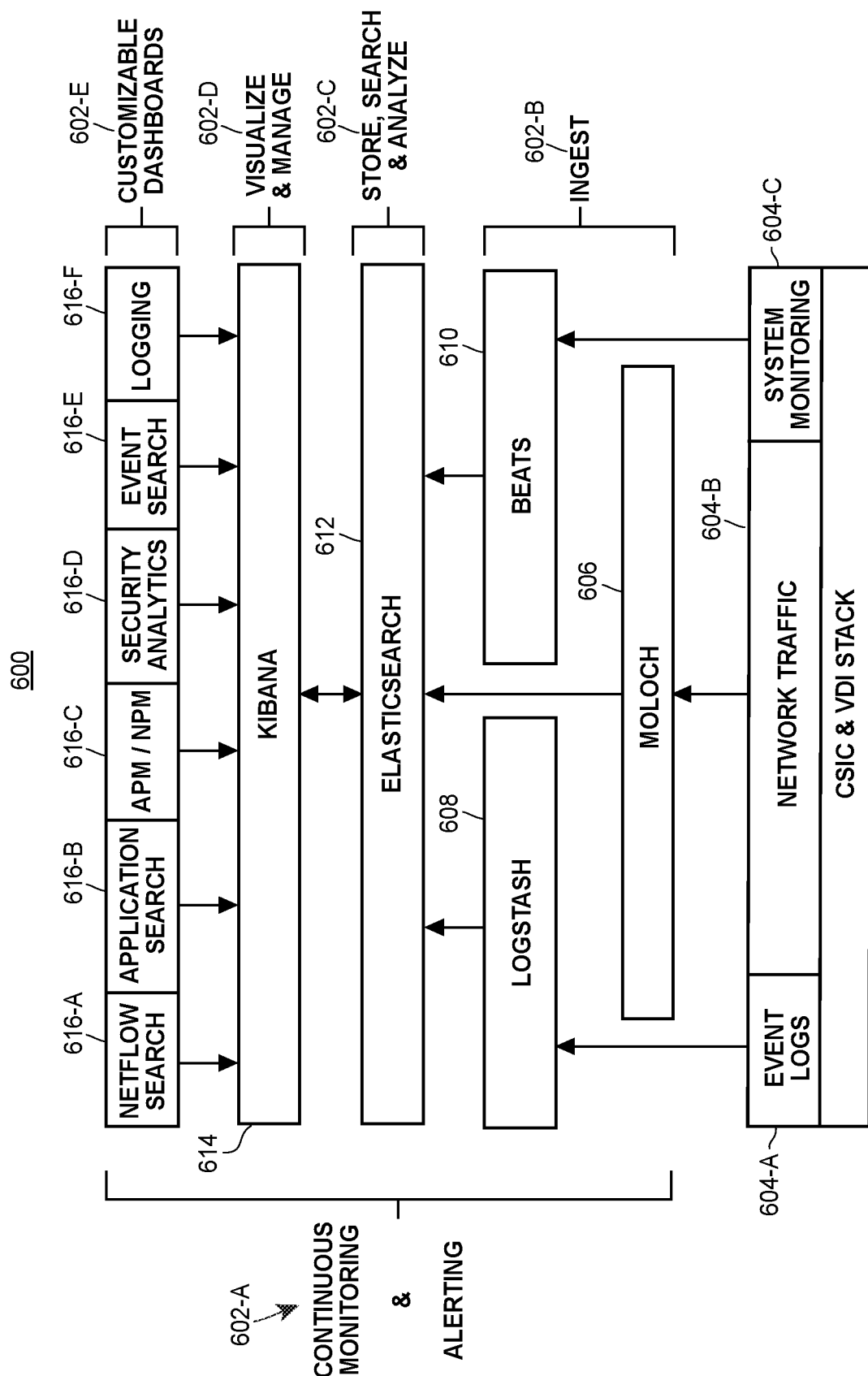
FIG. 6A depicts a block diagram of an exemplary method for performing continuous monitoring, according to one embodiment.

FIG. 6A depicts a block diagram of an exemplary method 600 for performing continuous monitoring, according to one embodiment. The method 600 may be performed by a continuous monitoring platform that is an Advanced Solutions Monitoring Platform (ASMP), according to one embodiment. The method 600 may provide a centralized monitoring capability that utilizes the OOBM network described above to connect to physical and virtual assets hosted within the SCRAaaS. The method 600 may provide a centralized set of tools that may be accessed by subcomponents of the MS-OPS component 508-A (e.g., the system administration services subcomponent 506-A, the network operations subcomponent 506-B, the security operations subcomponent 506-C and/or the service desk operations component 506-D) to monitor black, gray and/or red networks (e.g., one or more of the network layers 110, the networks 204 and/or the networks 302).

The method 600 may include instructions for performing the following management and reporting capabilities: Availability & Performance Monitoring/Reporting; Disaster Recovery Mechanisms; Configuration Management; Configuration Change Detection & Compliance Monitoring/Reporting; Event/Incident Alerting & Performance Monitoring/Reporting; Virtual Machine & Hypervisor Monitoring/Reporting; Network NetFlow Analysis; SYSLOG Repository; Vulnerability Management Monitoring/Reporting; Storage Volume Monitoring/Reporting; and Backup System Availability & Performance Monitoring/Reporting.

The method 600 may include a continuous monitoring & alerting routine (block 602-A), an ingestion routine (block 602-B), a storage, search and analyzing routine (block 602-C), a visualization and management routine (block 602-D), and a dashboard routine (block 602-E). The routines 602 may generally process input packets from the CSfC and VDI stack in the form of one or more event logs (block 604-A), network traffic (block 604-B) and system monitoring information (block 604-C).

The method 600 may receive and process network traffic (block 606). The network traffic may include TCP/IP packets, and may be processed by a packet indexing and capture tool (e.g., Arkime, Moloch, etc.). The packet indexing and capture tool enables NetFlow data to be captured and viewed. The method 600 may receive event logs (block 608). In some embodiments, the method 600 may include processing the event logs using a log forwarder (e.g., logstash).

The method 600 may include ingesting system monitoring information (block 610). In some embodiments, ingesting the system monitoring information may include collecting logs or metrics using one or more beats library (e.g., Filebeats, Packetbeats, Metricbeats, Heartbeats, etc.).

The method 600 may further include receiving forwarded event logs, forwarded packets, and/or forwarded system monitoring information (block 612). The method 600 may include indexing the forwarded event logs, forwarded packets, and/or forwarded system monitoring information using a log indexer (e.g., ElasticSearch).

The method 600 may include generating analytics and/or visualizations of the indexed logs (block 614). The visualizations and/or analytics may be generated using an open source tool, such as Kibana, in some embodiments. The method 600 may enable viewing of visualizations and/or analytics via a plurality of customizable dashboards (block 616-A through block 616-F).

Specifically, the method 600 may include facilitating viewing of analytics and/or visualizations, and searching related to NetFlow (block 616-A). The method 600 may include facilitating viewing of analytics and/or visualizations, and searching related to one or more applications (block 616-B). The method 600 may include facilitating viewing of analytics and/or visualizations related to Application Performance Management (APM) and/or Network Performance Monitoring (NPM) (block 616-C). The method 600 may include facilitating viewing of analytics and/or visualizations related to security (block 616-D). The method 600 may include facilitating viewing of analytics and/or visualizations, and searching, related to one or more events (block 616-E). The method 600 may include facilitating viewing of analytics and/or visualizations, and searching, related to logging (block 616-F). The depicted blocks 616 are intentionally simplified for explanation. Those of ordinary skill in the art will appreciate that many other dashboards, displaying a variety of different information, may be displayed.

Figure 6B:
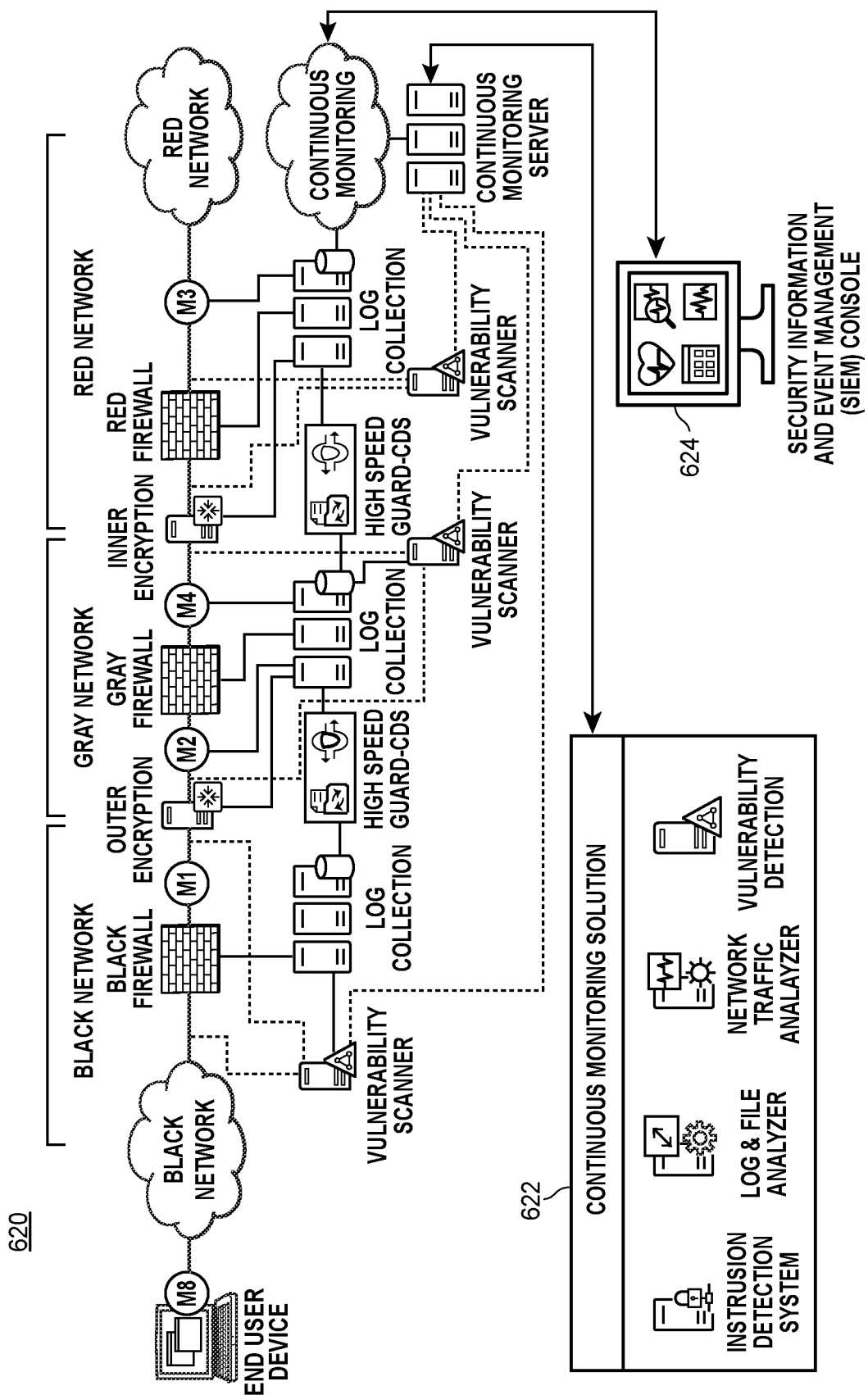
FIG. 6B depicts an exemplary environment for performing continuous monitoring within a secure classified remote access as a service network, according to one embodiment.

FIG. 6B depicts an exemplary environment 620 for performing continuous monitoring within a SCRAaaS network, according to one embodiment. In some embodiments, the method 600 may be performed using the environment 620. Some of the components in the environment 620 (e.g., an end user device, black network, gray network and red network) are depicted in above figures, such as FIG. 1, FIG. 2A, FIG. 2B, FIG. 2C, FIG. 3, FIG. 4A, FIG. 4B and FIG. 6A. In addition, FIG. 6B includes a continuous monitoring solution element 622 that is communicatively coupled to a plurality of vulnerability scanners throughout the SCRAaaS network, and a continuous monitoring element that includes a SIEM console 624.

The continuous monitoring solution element 622 includes an intrusion detection system (IDS), a log and file analyzer, a network traffic analyzer (e.g., Solarwinds NetFlow Traffic Analyzer), and/or a vulnerability detection service. Each of these may analyze packet traffic as it flows through the SCRAaaS network, and generate alerts and/or perform mitigating actions if/when a security issue is detected. The SIEM console 624 may provide system monitors with insights into activities within the SCRAaaS network, and may include instructions for performing statistical analysis, machine learning, etc. to derive meaning from packet flows.

Advantageously, the environment 620 may be combined with the O&M subsystem of the environment 500, thus joining together 24×7×365 support with capabilities with real-time and performance trend data from the continuous monitoring environment, enabling proactive management of the SCRAaaS environment and immediate response to production incidents, detected network threats, etc. This capability represents a significant improvement over conventional techniques, and enables remediation to the Regional Cyber Command (RCC)/Defensive Cyber Operations Division (DCOD) in government contexts.

As noted above, in some embodiments, the present techniques improve existing techniques by succeeding in complex assemblies of COTS software. For example, in some embodiments, the environment 620 may further include a SYS LOG server (e.g., a Kiwi Syslog server), automated network configuration and change management software (e.g., Solarwinds Network Configuration Manager), a Physical Network Performance Monitor (e.g., SolarWinds Network Performance Monitor), a Deep Packet Inspection software package (e.g., Suricata), a Virtualization Manager (e.g., VMware vCenter Server), a Full Stack Operations Management tool (e.g., VMware vRealize Operations Manager), an Intelligent Logging And Analytics tool (e.g., VMware vRealize Log Insight), a tool to discover, optimize and troubleshoot application security and network connectivity (e.g., VMware vRealize Network Insight); and/or a NetFlow anomaly detection tool (e.g., Zeek).

In some embodiments of the continuous monitoring environment 620, additional subcomponents are included in the MS-OPS component 508-A of the O&M subsystem. For example, the O&M subsystem may include a security continuous monitoring subcomponent (not depicted) that includes instructions for conducting continuous monitoring to maintain ongoing awareness of information security, vulnerabilities, and threats to support risk management decisions based on one or more protocol documents (e.g., the NIST SP 800-137). By continuously monitoring the security controls associated with the SCRAaaS enclave, the continuous monitoring subcomponent maintains ongoing system security compliance and provides an organized approach to managing, controlling, and documenting changes to the system. The continuous monitoring component may include further instructions for conducting routine vulnerability scans with Government provided Assured Compliance Assessment Solution (ACAS) software. The vulnerability management tool may be hosted on each network segment of the OOBM network within the SCRAaaS environment (e.g., in a black network segment, in a gray network segment and/or in a red network segment) is and capable of scanning all of the assets connected to those networks.

In some embodiments, the vulnerability management tool may include instructions for responding to incidents. For example, if an incident does arise, the vulnerability management tool may execute Incident Response Plan instructions, Communication Plan instructions, Notification Management Plan instructions, etc. to take appropriate action and notify the proper parties. The vulnerability management tool may include further instructions for handling an outage/ unscheduled downtime, by opening a ticket, notifying personnel of the current issue and potentially impacted users, notifying NETCOM appointed personnel, and notifying other leadership individuals. In yet further embodiments, the vulnerability management tool may include instructions for generating a Root Cause Analysis (RCA) and After-Action Report (AAR) once the issue has been resolved.

The environment 620 enables key stakeholders to generate recurring service reports with detailed availability, uptime, outages, and utilization reports to the full extent possible. The reports help decision makers evaluate system performance, potential issues, and provide invaluable trend analysis.

Exemplary Out-of-Band Management (OOBM) Architecture Embodiments

Figure 7:
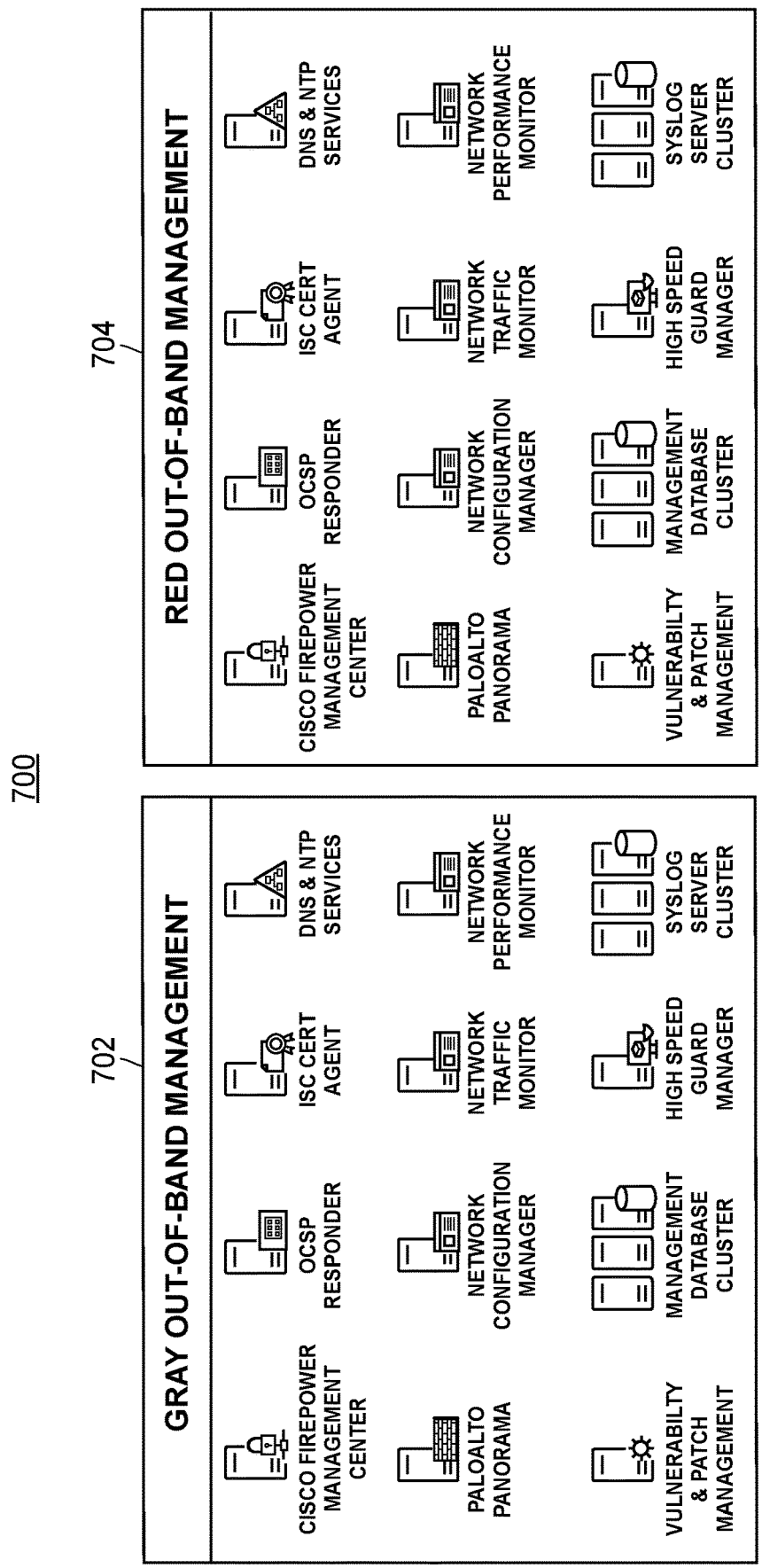
FIG. 7 is a block diagram depicting a gray out-of-band management network and a red out-of-band management network, according to one embodiment and scenario.

One of the key security elements of the presently described SCRAaaS solution is the inclusion of an OOBM network. FIG. 7 is a block diagram depicting a gray OOBM network 702 and a red OOBM network 704, according to one embodiment and scenario. For example, the gray OOBM network 702 may correspond to the OOBM servers 228-B of FIG. 2B. The red OOBM network 704 may correspond to the OOBM servers 220-C of FIG. 2C. The gray OOBM network 702 and the red OOBM network 704 provide additional layers of security to the SCRAaaS solution by providing dedicated management networks on the black, gray, and red networks described above. Specifically, the OOBM networks establish physical separation of management functions, activities, and applications from production applications and end-user connectivity. OOBM communication between black, gray, and red enclaves is possible via the CDS 222 that allow SYSLOG, SNMPv3, and other types of management traffic to be sent to centralized toolsets (e.g., the continuous monitoring environment 620) and consolidated into a single location.

In some embodiments, the OOBM network 702 and/or the OOBM network 704 may enable one or more subcomponents of the MS-OPS component 508-A (e.g., the system administration services subcomponent 506-A and/or the network operations subcomponent 506-B) to perform various functions without impacting production network performance, including: remote administration via RDP/SSH; patching/updating firmware, operating systems, applications, and other types of software; backup of network devices, servers, applications, and databases; and vulnerability scanning and reporting.

To limit access to the OOBM network 702 and the OOBM network 704, the MS-OPS component 508-A may deploy an access control solution (e.g., an Aruba ClearPath Secure Network Access Control solution) to provide a centrally managed user access control solution. The access control solution may apply Role Based Access Control (RBAC) to limit the functions and capabilities of user accounts to the lowest privilege level required to perform the respective account's tasks. Configuring the MS-OPS component 508-A in this way enables the performance of routine Authentication, Assessment, and Accounting (AAA) assessments to ensure only authorized accounts are active and permitted on the OOBM networks.

Exemplary Computing Environment Embodiments

FIG. 8A depicts an exemplary computing environment 800 for implementing CSfC computing systems, according to one embodiment and scenario. In general, the computing environment 800 may implement the environment 100, the system 100, and/or the VDI subsystem, in embodiments. The computing environment 800 may include a black CSfC stack group 802-A and a gray CSfC stack group 802-B. The black CSfC stack group 802-A may include a black CSfC computing stack 804-A and a black management stack 804-B.

The black CSfC computing stack 804-A may correspond to one or more elements of the system 200 of FIG. 2A, in some embodiments. For example, the black CSfC computing stack 804-A may correspond to the load balancers 214, one or more of the switches 212, one or more of the firewalls 216, etc. of FIG. 2A. In some embodiments, more or fewer elements of the system 200 may be embodied in the stack 804-A. The black management stack 804-B may correspond to one or more elements of the system 200. For example, the black management stack 804-B may correspond to the OOBM servers 220-A and the switch 212-G, in some embodiments.

The gray CSfC stack group 802-B may include a gray CSfC stack 804-C and a gray management stack 804-D. The gray CSfC stack 804-C may correspond to one or more elements of the gray network layer 204-B of FIG. 2B. For example, portions of the gray network layer 204-B may be embodied in the gray CSfC stack 804-B. The management stack 804-D may implement one or more portions of the gray network layer 204-B. For example, the management stack 804-D may implement the gray network boundary 206, the link 210-G and the link 210-H, the continuous monitoring servers 226-B and the switches 212-L and 212-M. Of course, other implementations and mapping of the system 200 to the gray stack group 802-B are envisioned.

As shown in FIG. 8A, the stack groups 802 may include one or more blade computing devices (e.g., one or more servers), installed in a server rack. The one or more blade computing devices may be networked together, and/or communicatively coupled to one or more additional networks. The elements of the stack groups 802 may be implemented using user-level software and/or specialized hardware, depending on the embodiment and scenario. For example, one or more memories in the black CSfC stack may include instructions that, when executed, cause one or more elements of the black network layer 204-A (e.g., a software load balancer, switch, firewall, etc.) to be configured. For example, one set of instructions may cause a DMZ corresponding to the DMZ 320 of FIG. 3 to be created. Of course, any of the elements of the environment 100, the system 200, etc. may be created in this way. The set of instructions may be expressed using one or more monitored services (e.g., daemon processes) and may be configured via configuration files, in some embodiments.

FIG. 8B depicts a red CSfC stack and red VDI stack group 802, according to an embodiment. The stack group 802 includes a plurality of stacks, each corresponding to a server rack including one or more respective blade servers implementing various functionality. The stack group 802 includes a red CSfC stack 804-E, a disconnected communications stack 804-F, a storage and backup stack 804-G, a management stack 804-H, a first VDI cluster stack 804-I, a second VDI cluster stack 804-J, a third VDI cluster stack 804-K; and a fourth VDI cluster stack 804-L.

The red CSfC stack 804-E may include instructions implementing elements of the online red network 204-C and the offline red network 204-D. For example, the red CSfC stack 804-E may include a set of instructions for implementing one or more of the switches 212, one or more of the firewalls 216-E, one or more of the distribution consoles 240, etc.

The disconnected communications stack 804-F may include instructions for implementing the offline, or disconnected, aspects of the red network 204. Specifically, the disconnected communications stack 804-F may include instructions for detecting and managing disconnection and reconnection events of one or more end user devices. The disconnected communications stack 804-F may be configured to allow synchronization of an end user device with one or more desktop images when network connectivity of the end user device restored, as discussed above. The disconnected communications stack 804-F may enforce read-only access for certain end-user devices and/or user profiles.

The storage and backup stack 804-G may include instructions for storing data within the computing environment 800. Specifically, the storage and backup stack 804-G may include instructions for storing end user device session data, desktop image data, packet data, event log data, system monitoring data, etc. The storage and backup stack 804-G may include one or more electronic database and may implement and/or be communicatively coupled to, one or more big data filesystems or storage solutions, such as a storage area network (SAN), network attached storage (NAS), etc. The storage and backup stack 804-G may include instructions for creating full and/or incremental backups of information in the computing environment 100.

The management stack 804-H may include instructions for management purposes with respect to the present techniques. For example, the management stack 804-H may implement the gray management services node 114-A, one or more of the gray OOBM servers 220-B, the continuous monitoring solution 622, etc. The stack group 802 may reside in a secure data center (e.g., at a military base). By centralizing management in the management stack 804-H, the present techniques advantageously enable all management functions to be performed at the data center level (i.e., in the cloud). The same centralization and control benefits apply to the other components of the stack group 802. High levels of security already achieved by the segmented networking architecture described above are further improved by confining management, data, and VM images to the stack group 802.

The first VDI cluster stack 804-I, the second VDI cluster stack 804-J, the third VDI cluster stack 804-K; and the fourth VDI cluster stack 804-L may be horizontally scaled hardware instances supporting the VDI subsystem 300 of FIG. 3. For example, the first VDI cluster stack 804-I may handle a first number of users (e.g., 1000) accessing the VDI subsystem 300. The second VDI cluster stack 804-J may handle the next number of users, and so on. In some embodiments, the VDI cluster stacks 804 may each correspond to a respective network (e.g., the green network 320-C a red network 320-D). The design of the red CSfC stack and red VDI stack group 802 improves over conventional SCRAaaS implementations, by enabling the red CSfC stack and red VDI stack group 802 to be horizontally and vertically scaled, by adding a further cluster stack 804 (e.g., a further VDI cluster, a further storage and backup stack, etc.).

In some embodiments, one or more of the elements of the network layer 204-A may be implemented in hardware (e.g., via a flash memory in a switch, router, or other specialized networking hardware device). In such embodiments, one or more of the elements of the black network layer 204-A may be implemented one or more hardware devices, rather than user-level software packages.

It will be appreciated by those of skill in the art that the embodiments discussed above are intentionally simplified for explanatory purposes, and that other configurations are envisioned. For example, in some embodiments the black network may consist of a single switch. In some deployments, the offline red network may be omitted. In still further embodiments, additional VPNs, firewalls and/or network services may be added to add certain functionality. For example, a Content Delivery Network (CDN) may be added in the black network to improve access to static assets. Still further, the practical considerations of some deployments and related embodiments may include additional customized instruction sets. For example, the end user device 102 of FIG. 1 may include instructions that cause the destruction of the memory of the end-user device (e.g., by deleting network configuration files) if the security of a location becomes compromised (e.g., an embassy). The operation of the methods and systems disclosed herein will now be further discussed with reference to an exemplary computer-implemented method.

Exemplary Computer-Implemented Methods

Figure 9:
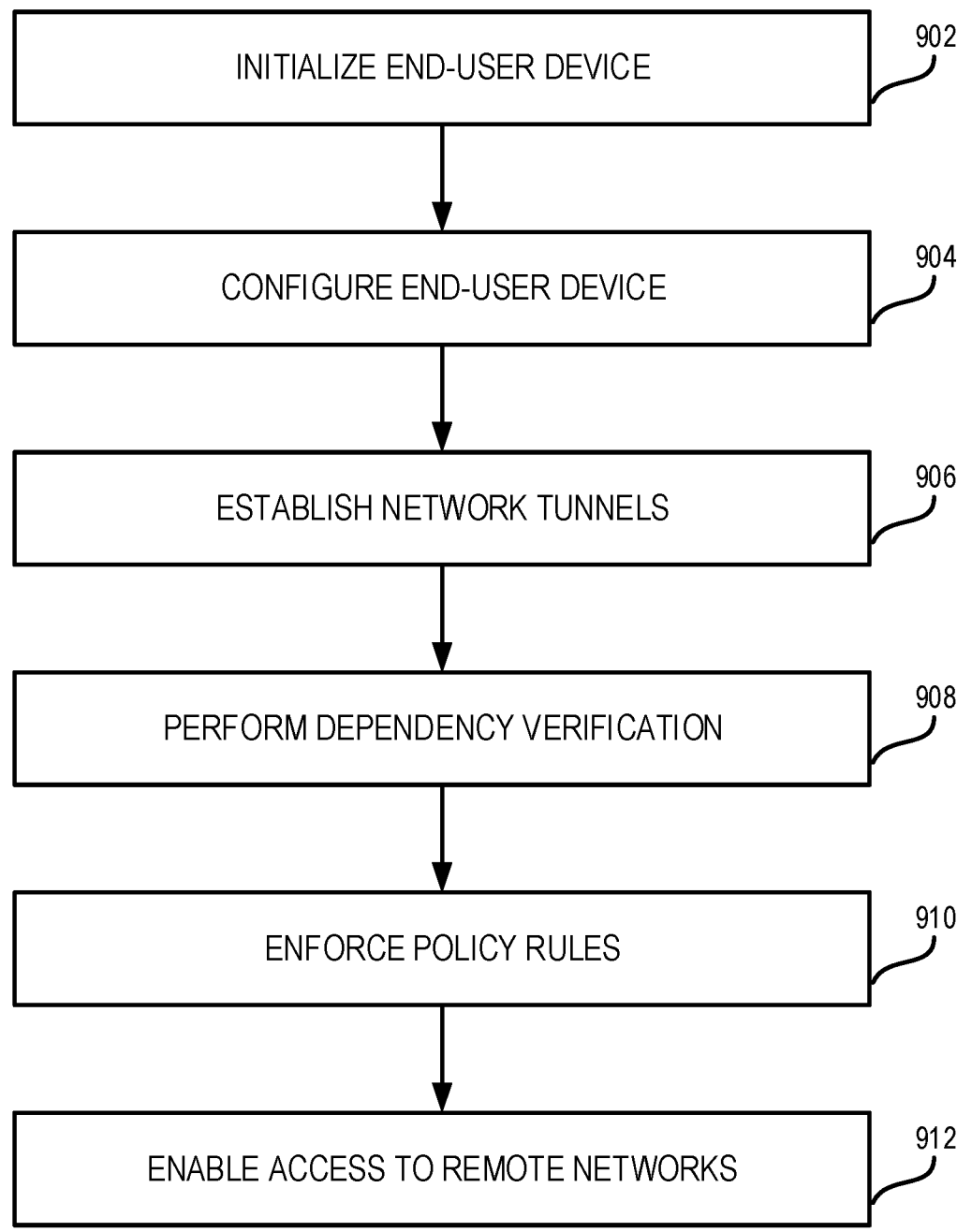
FIG. 9 depicts an exemplary computer-implemented method for providing a virtual desktop infrastructure to an end-user device via secure classified remote access as a service.

FIG. 9 depicts an exemplary computer-implemented method 900 for providing a virtual desktop infrastructure to an end-user device via secure classified remote access as a service. The method 900 may enable the end-user device to securely access one or more multiple-classification/multiple-security networks.

The method 900 may include initializing an end-user device (block 902). For example, the initialization may occur in response to the user (e.g., an employee of a corporation, a member of the U.S. military, a member of the U.S. intelligence community, etc.) powering on an end-user device (e.g., the EUD 102, the EUD 202-A, the EUD 202-B, the EUD 304, the EUD 402, the EUD 432, the end-user device depicted in FIG. 6B, etc.). In some embodiments, the initialization scripts may perform the initializing according to a schedule (i.e., according to an absolute time schedule, such as a given date/time, and/or according to a relative time schedule, such as every 15 minutes, or more/less frequently). In some embodiments, powering on the end-user device may include waking the end user device from a device sleep or device suspend state (e.g., via Wake-on-LAN). The memory of the end-user device may include instructions (e.g., one or more initialization scripts) that perform certain functionality when the device is powered on/awoken from a sleep or a spend state.

In some embodiments, the end user device may connect to the public internet (e.g., via the black network 104, via the link 210-D, via the MiFi device 306, etc.) as depicted in the environment 100, the system 200, the VDI subsystem 300, etc. using a home workstation that lacks a wireless internet connection. In that case, the initialization scripts may include instructions for connecting to a wireless base network when the end user device a network adapter becomes active.

The method 900 may include configuring the end-user device (block 904). In some embodiments, the end user device may automatically configure network interface controller (e.g., a WiFi adapter, an Ethernet interface, etc.). For example, the EUD 402 may configure the wireless adapter 406 and/or the wired adapter 408. In some embodiments, the end user device configuration scripts determine at a given time (e.g., when booting up, when waking up, etc.) whether a WiFi adapter is available. The end user device may automatically connect to the WiFi adapter, and disable any available Ethernet interfaces. Conversely, in some embodiments, the configuration scripts in the end user device may disable any available WiFi interfaces when an Ethernet interface is available. The end-user device may be configured to prefer either wired or wireless connections, by the company and/or by a user of the end-user device. The configuration scripts may include further instructions that automate security settings (e.g., by closing one or more ports, stopping one or more services, etc.), and perform public-key infrastructure configuration/joining.

As discussed above, in some embodiments, disconnected embodiments, the scripts may include instructions for configuring two separate red (i.e., secret/classified) network paths (i.e., tunnels). The instructions may determine whether there is an internet connection, and when there is, configure the end-user device to route traffic via a standard VDI path (e.g., via a Citrix remote desktop).

When the scripts determine that an internet connection does not exist, the scripts may configure the end-user device to operate in offline mode. In offline mode, a local VM specific to a customer site assigned to the end-user may be selected (e.g., at boot-up) that accesses an offline red network (e.g., the offline red network 204-D of FIG. 2C). The offline mode may be limited to a set of users (e.g., to VIP users). The offline mode is particularly advantageous for scenarios having limited connectivity (e.g., overseas deployments). In offline embodiments, the scripts may include additional instructions that monitor the network connection of the end-user device, and when an internet connection is detected, connect via the VM to a second red network (e.g., the online red network 204-C). The scripts may include instructions for pushing work into a temporary staging area while the end-user device is in offline network mode, and for synchronizing the pushed work to the online network once a connection to the online red network is restored. In some embodiments, the user may selects information to transfer to the online remote red network, and/or a red network administrator may copy scanned/verified information from the network from the staging area to a correspondent secure area. In still further embodiments, a high-speed guard (e.g., cross-domain solution implementing a one way transfer from an unsecured network to a secured network) may perform the transfer of data from one red network to another red network.

Having initialized and configured the network interface controller of the end-user device (e.g., the EUD 102) and configured the security and cryptography settings of the end-user device, the configuration scripts may next establish one or more network tunnels (e.g., via the VPNs 116, via the inner VPN 418, via the inner VPN 420, via the outer VPN 414, via the gray network boundary 206, via the red network boundary 232, etc.) to enable the end user device to connect to one or more remote services (e.g., to NIPRNet 242 via the network regions 110 over the links 212) (block 906). Specifically, the method 900 may include establishing tunnel links from the end-user device to one or more of a black network, a gray network, and/or one or more red networks. In some embodiments, the configuration scripts may configure the user's connection to the remote services via intermediating cross-domain boundary services (e.g., via the one or more cross domain boundary distribution consoles 240 of FIG. 2C). In that case, the end-user device may be a TTC device (e.g., a ForcePoint TTC Remote device, as discussed above). In some embodiments, the one or more network tunnels may be individually dynamically configured based on one or more conditions. For example, the end-user device may determine latency between multiple remote networks, and create a tunnel to the remote network having the lowest latency value.

The method 900 may include performing dependency verification (block 908). The dependency verification step may include determining whether the end-user device is presently configured to include certain dependencies (e.g., an active directory configuration, a recursive DNS configuration, a port forwarding configuration, a PKI server configuration, etc.). The dependency verification step may include policy-based rules based on entity requirements. For example some government clients may require that policy rules based on Security Technical Implementation Guides (STIGs) or Security Requirements Guides (SRGs) are applied to the network settings of the end-user device at different stages and according to other criteria (e.g., which services are running on the end-user device, which classification level(s) the end-user device is configured to access, etc.).

In some embodiments, the method 900 may include enforcing policy rules (block 910). For example, in some embodiments, the policy rules may determine whether classified info is permitted to reside in a device with non-classified data, and adjust network configuration automatically (e.g., by removing access to a classified network when non-classified data is present, or vice versa). The policy rules may upgrade and/or remove network access of the end-user device based on a detected condition, including the identity of the user, the activity of the user, data present in the memory of the end-user device, events external to the end-user device, etc. In some embodiments, the configuration scripts may include instructions for facilitating the accreditation of the configuration (e.g., a third party audit). The configuration scripts may include instructions for performing data at rest encryption.

In some embodiments, enforcing the policy rules may include automatically renewing end-user device certificates. Specifically, the end-user device may include instructions for performing a certificate renewal check. The instructions may include a renewal time code the scripts checks every time laptop is initialized. If the laptop's certificates are expiring within a predetermined time period (e.g., within 30 days), the instructions may renew the certificates. It should be appreciate that the renewal may require additional steps, such as configuring one or more tunnels, VPNs, remote access capabilities, etc. Where conventional approaches to secure classified remote access as a service techniques fail to automatically renew authentication mechanisms across all private networks, the present techniques succeed. The certificate renewal process may be performed at the dependency verification stage, in some embodiments.

As shown above (e.g., in the environment 100), the network environment of the present techniques may include one or more remote user devices, connected to one or more end user devices over network. As shown (e.g., in FIG. 3, FIG. 4B and FIG. 4C) a MiFi device (e.g., a locked down mobile hotspot) may facilitate the connectivity. To this end, in some embodiments, the configuration scripts may enforce policies that only permit the end user device to connect to this MiFi device, and do not allow the end user device to connect to other devices. Such exclusivity may be enforced via cryptographic certificates, in some embodiments.

Once the scripts initialize, configure and policy check the end-user device the scripts may include instructions for causing the end-user device to access the virtual desktop infrastructure (e.g., the VDI subsystem 300) via the one or more remote computer networks (e.g., the networks 204). The access may be performed via a switch matrix (e.g., beginning with the switches 212-A and/or 212-B of FIG. 2A, and including the load balancers 214, firewalls 216, etc.) (block 912). For example, the scripts may cause the end-user device to download and execute one or more virtual desktop images. The scripts may cause the end-user device to connect to one or more remote distribution consoles. The scripts may cause the end-user device to connect to one or more remote desktop servers, and/or to display a remote desktop in the output device of the end-user device.

As discussed above, depending on the location of the end-user device, the scripts may execute different initialization, configuration and policy check routines. The networks may have different respective classification levels, in some embodiments. For example, the end-user device may access one or more outer encryption devices (e.g., the one or more outer encryption devices 218) via an unclassified network (e.g., via black network 204-A of FIG. 2A). From the outer encryption devices, the end-user device may access a secured gray network (e.g., the gray network 204-B). The end-user device may access one or more inner encryption devices (e.g., the inner encryption devices 238) via the secured gray network to reach one or more red (i.e., a classified) networks (e.g., the online red network 204-C and/or the offline red network 204-D). Each network provides different levels of access according to the credentials of the end-user device and/or the user profile.

As noted above, the present techniques include additional continuous monitoring and out-of-band management capabilities. In some embodiments, all packets transiting the system 200, for example, are captured by the continuous monitoring servers 226 as described with respect with FIG. 6A. As discussed, a system administrator or security professional may query the packet flow data using the dashboards 602-E, to identify and analyze system behavior and use patterns. The OOBM capabilities provide administrators with separate communication channel(s) that may be used to administer the system 200, even in the event that the performance of other transport links (e.g., one or more of the links 210) is degraded. The OOBM subsystem including the OOBM servers 220 may provide notification capabilities by proactively monitoring and alerting operations and maintenance staff to prevent critical systems from failing, or by completely mitigating the risk of a catastrophic component or system failure.

The present techniques may be used to facilitate secure access to existing services. However, the present techniques may also provide an environment that may be used for additional purposes once operational. For example, a separate instance of the environment 100 (i.e., a training environment) may be instantiated. Artificial intelligence (AI) and/or machine learning techniques may then be used to automatically and dynamically change the SCRAaaS environment. For example, a system controller included in the method 600 may include instructions for performing predictive analysis on packet data received from the CSfC & VDI stack to dynamically change the training environment. The environment 100 may be referred to as a classroom as a service, and may be used for cyberwarfare training by emulating the real world and allowing students to practice against adversaries. The environment 100 may be modified based on student behavior, and may aid in identifying cheating. The automation of the AI and/or machine learning techniques improve conventional network intrusion training systems by avoiding manual effort and enhancing realism.

ADDITIONAL CONSIDERATIONS

The following considerations also apply to the foregoing discussion. In the drawings, and sometimes in the specification, reference is made to certain abbreviations. The following Abbreviations Table provides a correspondence between the abbreviations and the item or feature.

| Abbreviations Table | |
|---|---|
| A&A | Assessment and Authorization |
| AGM | Army Gold Master |
| C5ISR | Command, Control, Communications, Computers, Cyber, Intelligence, Surveillance And Reconnaissance Center |
| CDA | Cross Domain Access |
| CDS | Cross-Domain Solutions |
| CSfC | Commercial Solutions For Classified Program |
| DaaS | Device As A Service |
| DAR | Data At Rest |
| DoD | Department Of Defense |
| DoDIN | United States Department Of Defense Information Networks |
| EUD | End-User Device |
| IPS | Intrusion Prevention System |
| MACP | Mobile Access Capability Package |
| MILS | Multiple Independent Levels Of Security |
| NIPRNet | Non-Classified Internet Protocol Router Network |
| NSA | National Security Agency |
| OOBM | Out-Of-Band Management |
| PMO | Program Management Office |
| SCRAaaS | Secure Classified Remote Access As A Service |
| SIPRNet | Secret Internet Protocol Router Network |
| TTC | Trusted Thin Client |
| VDI | Virtual Desktop Infrastructure |
| VPN | Virtual Private Network |

Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

It should also be understood that, unless a term is expressly defined in this patent using the sentence "As used herein, the term" "is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for implementing the concepts disclosed herein, through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. An internet end-user device for use by end users, the end: user device including:
    one or more processors,
    one or more network interface controllers; and
    a memory including instructions that, when executed by the one or more processors cause the end-user device to:
        initialize, via the one or more processors, the end-user device;
        configure, via the one or more processors, the end-user device to connect to one or more remote services via a first red network;
        establish, via the one or more network interface controllers, a network tunnel from the end-user device to a second red network via a black network and a gray network;
        perform, via the one or more processors, dependency verification with respect to the configuration of the end-user device;
        enforce, via the one or more processors, one or more policy rules with respect to the configuration of the end-user device; and
        cause the end-user device to access a virtual desktop infrastructure via the network tunnel.

2. The end-user device of claim 1, the memory including further instructions that, when executed by the one or more processors cause the end-user device to:
    initialize the end-user device in response to a waking up of the end-user device.

3. The end-user device of claim 1,
    wherein the first red network is an offline red network, and
    wherein the memory includes further instructions that, when executed by the one or more processors cause the end-user device to:
        push, when the end-user device does not have an active internet connection, user data into a staging area; and
        synchronize, when an active internet connection is detected, the user data to an online red network.

4. The end-user device of claim 1, the memory including further instructions that, when executed by the one or more processors cause the end-user device to:
    determine whether a current configuration of the end-user device includes at least one of an active directory configuration, a recursive DNS configuration, a port forwarding configuration, or a public-key infrastructure server configuration.

5. The end-user device of claim 1, the memory including further instructions that, when executed by the one or more processors cause the end-user device to:
    remove access to the established network tunnel between the end-user device and one or more red networks in response to a condition.

6. The end-user device of claim 1, the memory including further instructions that, when executed by the one or more processors cause the end-user device to:
    renew one or more cryptographic certificates in the end-user device.

7. The end-user device of claim 1, the memory including further instructions that, when executed by the one or more processors cause the end-user device to:
    access one or more virtual desktop images.

8. A computer-implemented method for providing a virtual desktop infrastructure to an internet end-user device for use by end users via secure classified remote access as a service, comprising:
    initializing, via one or more processors, the end-user device;
    configuring, via one or more processors, the end-user device to connect to one or more remote services via a first red network;
    establishing, via one or more processors, one or more network tunnels between the end-user device and one or more remote computer networks, wherein at least one of the remote computer networks is a black network;
    performing, via one or more processors, dependency verification with respect to the configuration of the end-user device;
    enforcing, via one or more processors, one or more policy rules with respect to the configuration of the end-user device; and
    causing the end-user device to access the virtual desktop infrastructure via the one or more network tunnels.

9. The computer-implemented method of claim 8, wherein the initializing of the end-user device is performed in response to a waking up of the end-user device.

10. The computer-implemented method of claim 8, wherein the one or more network tunnels include a first online red network path and a second offline red network path, and further comprising:
    pushing, when the end-user device does not have an active internet connection, user data into a staging area,
    synchronizing, when an active internet connection is detected, the user data via the first online red network path.

11. The computer-implemented method of claim 8, wherein establishing the one or more network tunnels between the end-user device and the one or more remote computer networks includes establishing tunnel links from the end-user device to one or more black networks, one or more gray networks, and one or more red networks.

12. The computer-implemented method of claim 8, wherein performing the dependency verification includes determining whether a current configuration of the end-user device includes at least one of an active directory configuration, a recursive DNS configuration, a port forwarding configuration, or a public-key infrastructure server configuration.

13. The computer-implemented method of claim 8, wherein enforcing the one or more of the policy rules with respect to the configuration of the end-user device includes removing access to one or more of the established network tunnels between the end-user device and the one or more remote computer networks in response to a condition.

14. The computer-implemented method of claim 8, wherein causing the end-user device to access the virtual desktop infrastructure via the one or more network tunnels includes accessing one or more virtual desktop images via the end-user device.

15. A non-transitory computer readable medium containing program instructions that when executed, cause an internet end-user device for use by end users to:
   initialize, via one or more processors, the end-user device;
   configure, via one or more processors, the end-user device to connect to one or more remote services via a first red network;
   establish, via one or more network interface controllers, a network tunnel from the end-user device to a second red network via a black network and a gray network;
   perform, via one or more processors, dependency verification with respect to the configuration of the end-user device;
   enforce, via one or more processors, one or more policy rules with respect to the configuration of the end-user device; and
   cause the end-user device to access a virtual desktop infrastructure via the network tunnel.

16. The non-transitory computer readable medium of claim 15, containing further program instructions that when executed, cause the end-user device to:
   push, when the end-user device does not have an active internet connection, user data into a staging area; and
   synchronize, when an active internet connection is detected, the user data to an online red network.

17. The non-transitory computer readable medium of claim 15, containing further program instructions that when executed, cause the end-user device to:
   determine whether a current configuration of the end-user device includes at least one of an active directory configuration, a recursive DNS configuration, a port forwarding configuration, or a public-key infrastructure server configuration.

18. The non-transitory computer readable medium of claim 15, containing further program instructions that when executed, cause the end-user device to:
   renew one or more cryptographic certificates in the end-user device.

19. The non-transitory computer readable medium of claim 15, containing further program instructions that when executed, cause the end-user device to:
   remove access to one or more of the established network tunnels between the end-user device and the second red network in response to a condition.

20. The non-transitory computer readable medium of claim 15, containing further program instructions that when executed, cause the end-user device to:
   access one or more virtual desktop images via the end-user device.

\* \* \* \* \*